United States Patent [19]
Koide et al.

[11] Patent Number: 5,924,722
[45] Date of Patent: Jul. 20, 1999

[54] AIR BAG APPARATUS

[75] Inventors: Teruhiko Koide; Shoichi Ibe, both of Aichi-ken, Japan

[73] Assignee: Kabushiki Kaisha Tokai-Rika-Denski-Seisakusho, Auchi-ken, Japan

[21] Appl. No.: 08/880,888

[22] Filed: Jun. 23, 1997

[30] Foreign Application Priority Data

Jun. 26, 1996 [JP] Japan .................................. 8-166400
Nov. 28, 1996 [JP] Japan .................................. 8-318257

[51] Int. Cl.⁶ .................................................. B60R 21/22
[52] U.S. Cl. ........................ 280/730.2; 280/741; 280/806
[58] Field of Search .............................. 280/730.1, 730.2, 280/741, 806

[56] References Cited

U.S. PATENT DOCUMENTS

| 5,322,322 | 6/1994 | Bark et al. | 280/730.2 |
| 5,362,097 | 11/1994 | Barske | 280/730.1 |
| 5,540,459 | 7/1996 | Daniel | 280/730.2 |
| 5,605,346 | 2/1997 | Cheung et al. | 280/730.2 |
| 5,755,457 | 5/1998 | Specht | 280/730.2 |

FOREIGN PATENT DOCUMENTS

WO 93/09977  5/1993  WIPO.

*Primary Examiner*—Kenneth R. Rice
*Attorney, Agent, or Firm*—Sixbey Friedman Leedom & Ferguson; Thomas W. Cole

[57] ABSTRACT

The present invention provides an air bag apparatus in which an inflator is set to be extended in a predetermined use position with no need to make the inflator large. A bag body of the air bag apparatus in a retracted state is disposed along a curved portion of the vehicle, a long strap is disposed within the bag body, and one end portion of the bag body and one end portion of the strap are fixed to the vehicle. In this structure, the other end of the strap is drawn by the activation of an inflator module so as to extend along the curved portion of the vehicle, and, further, gas is injected into the internal space of the bag body which is limited in motion by the strap so as to inflate and expand.

17 Claims, 18 Drawing Sheets

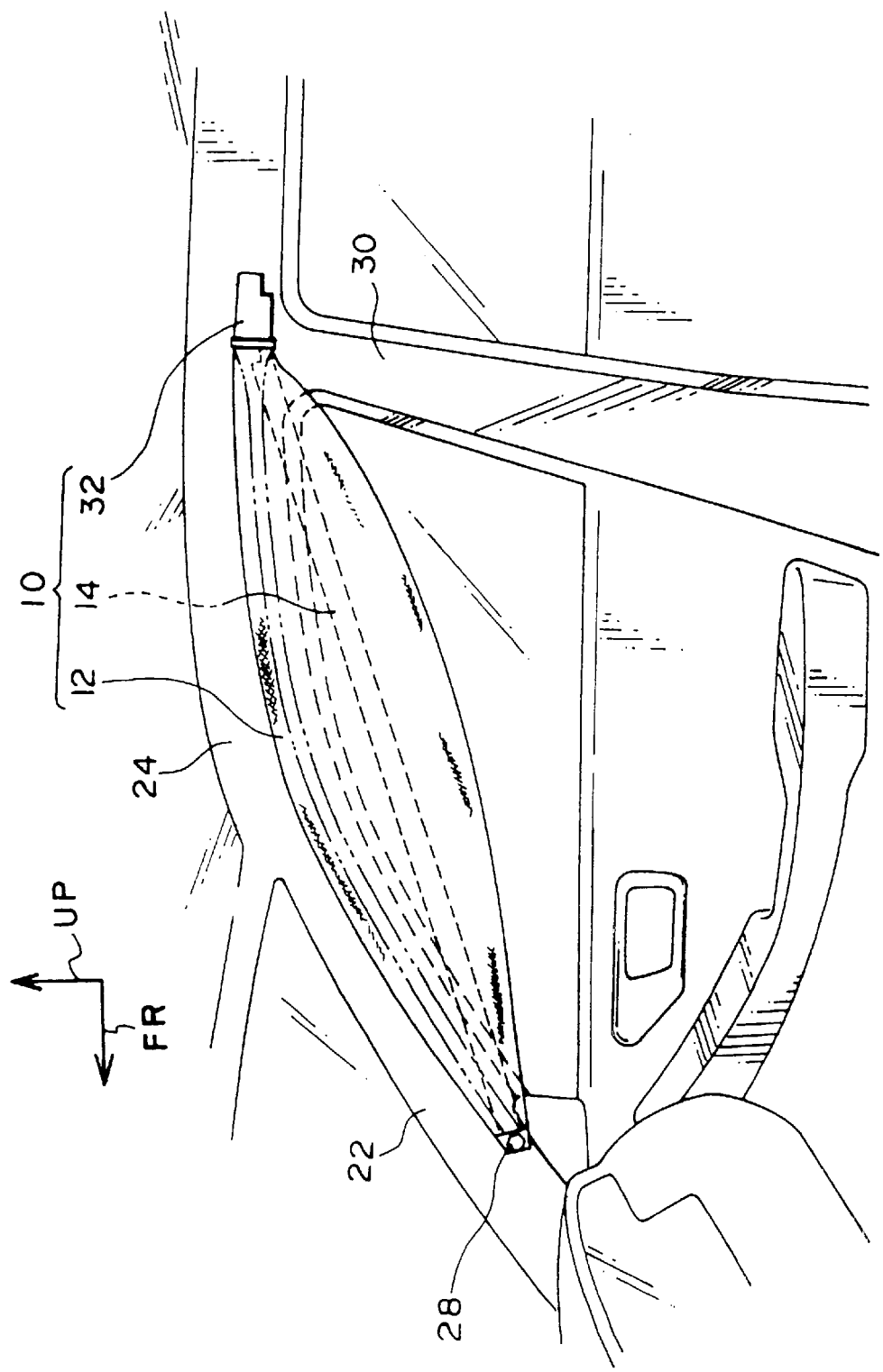

F I G. 3
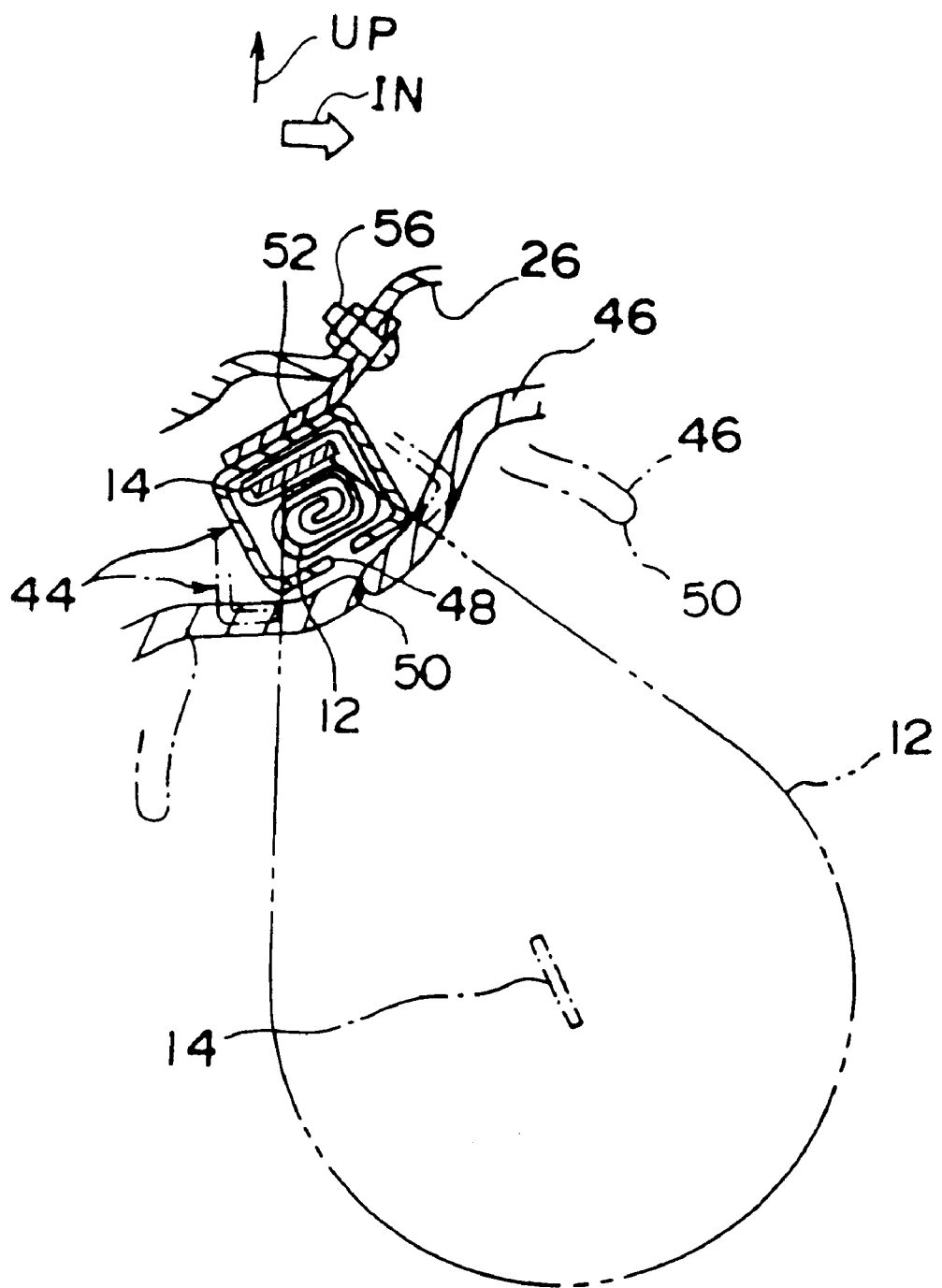

F I G. 7
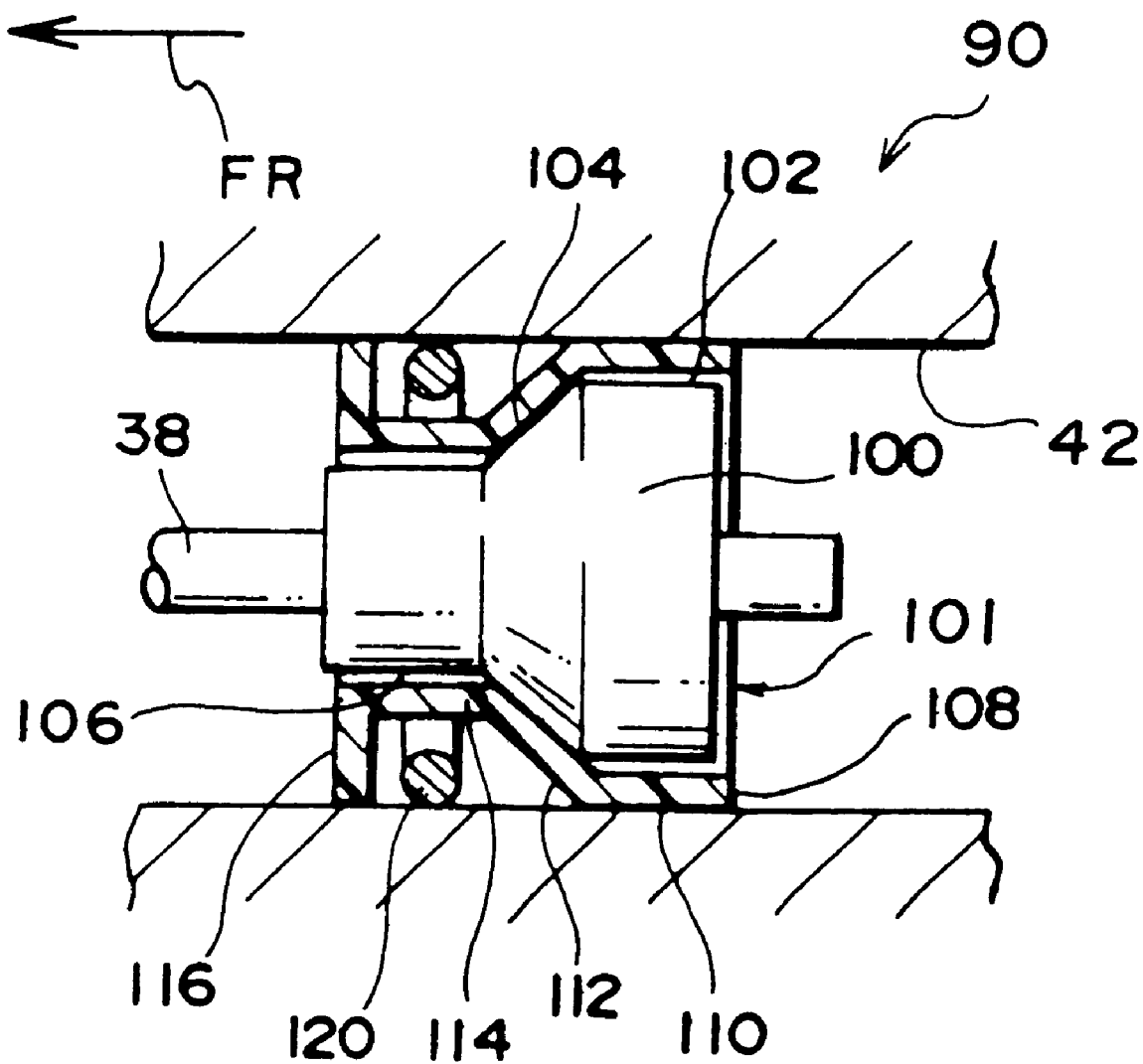

F I G. 1 1
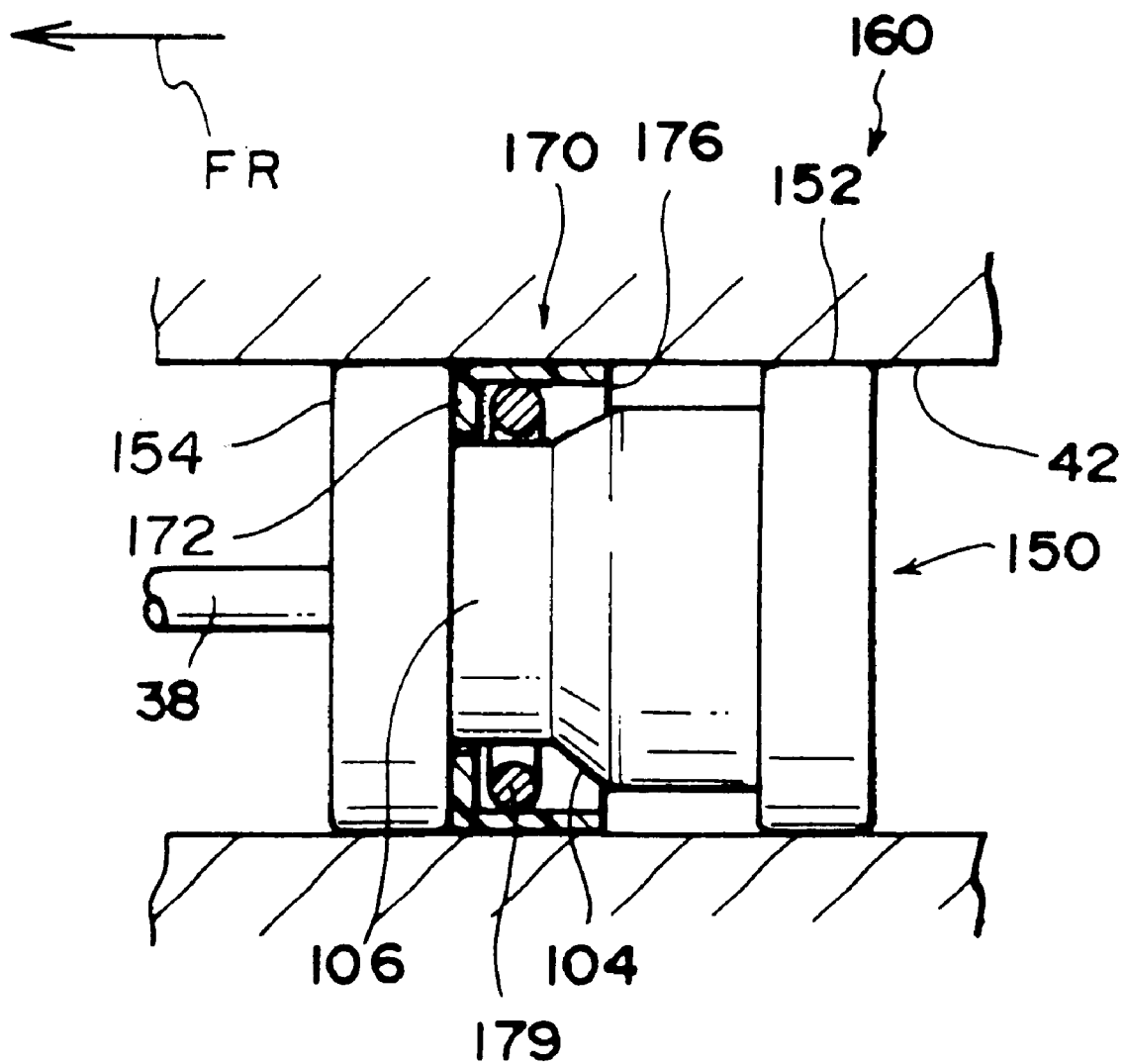

F I G. 1 7
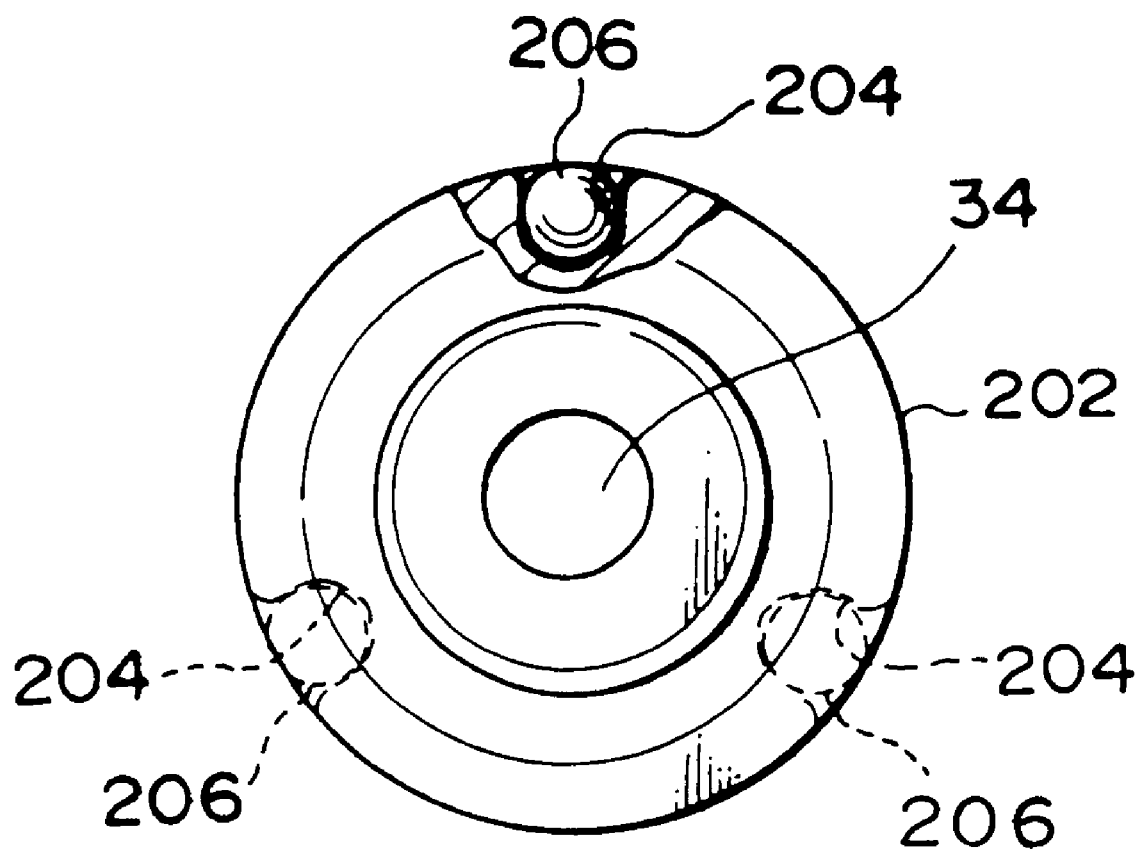

AIR BAG APPARATUS

BACKGROUND OF THE INVENTION

1. Field of the Invention

The present invention relates to an air bag apparatus for absorbing the kinetic energy from a head portion of a vehicle occupant by inflating a bag body between a side of a vehicle body and the head portion of the vehicle occupant.

2. Description of the Related Art

A structure is suggested for an air bag apparatus which inflates a bag body between the side portion of a vehicle body and the head portion of a vehicle occupant so as to support the head portion of the vehicle occupant and absorbs the kinetic energy from the head portion of the vehicle occupant when sudden acceleration is applied to the side of a vehicle (International Publication No. WO93/09977).

This type of air bag apparatus is structured so that the bag body is arranged between the lower portion of a front pillar and a portion of the roof side close to a center pillar and an inflator communicating with the internal portion of the bag body is activated at the time of a side collision, thereby supplying pressurized gas to the internal portion of the bag body so that the bag body is inflated and expanded in a portion corresponding to the head portion of the vehicle occupant.

In the above-described air bag apparatus for absorbing the kinetic energy of the head portion of the vehicle occupant, a tube-like bag body received in a curved portion between the front pillar and the roof side is extended from a support point disposed below the front pillar to a support point disposed near the center pillar in the roof side so that an intermediate portion of the bag body having a long tubular shape is required to be set to position in a position corresponding to the head portion of the vehicle occupant.

Accordingly, in the conventional air bag apparatus, it is considered that an end portion of a connection strap disposed between an opening of a window and the bag body is fixed near one end portion of the tube-like bag body, the connection strap is drawn toward the support point of the roof side when the bag body is inflated and expanded, and the tube-like bag body is linearly extended from the support point of the front pillar to the support point of the roof side free of looseness.

In this case, when the bag body is inflated and expanded, the bag body is compressed by the connection strap against a force which rapidly inflates and expands the bag body generated by filling it with pressurized gas injected by the inflator. Accordingly, if the drawing motion of the connection strap is performed by using a portion of the gas injection energy of the inflator for inflating and expanding the bag body, since the connection strap is drawn by a strong force, the output of the inflator is required to be large so that the inflator becomes large and the manufacturing cost also rises.

SUMMARY OF THE INVENTION

The present invention is made by taking the above-described problems into consideration, and an object of the present invention is to provide a low-cost air bag apparatus in which an inflator is set to be extended in a predetermined position of use with no need to make the inflator large.

An air bag apparatus in accordance with the present invention including a bag body in a retracted condition disposed along a curved portion of a vehicle with both ends supported and inflated and expanded by gas injected from an inflator to an internal portion thereof comprises a long strap disposed in the internal portion of the bag body and having one end supported at the vehicle body and drawing operation means for drawing the other end of the strap so as to extend the strap along the curved portion of the vehicle.

In the present invention, the curved portion of the vehicle means a portion of the vehicle including the curved portion so that the curved portion can include a noncurved portion and may be totally curved. The curved portion of the vehicle includes, for example, a continuous portion from the front pillar to the roof side.

In the air bag apparatus having the above-described structure, if the bag body is inflated and expanded by the activation of an inflator module, when the strap within the bag body is drawn by the drawing operation means, the strap is extended linearly and held in the area of the curved portion of the vehicle. Accordingly, the bag body is inflated and expanded with certainty in a predetermined expanding position.

In the above-described air bag apparatus, the drawing operation means can draw the strap by gas pressure generated in the inflator.

In the air bag apparatus having the above-described structure, when gas is generated by the operation of the inflator, the drawing operation means is activated by this gas pressure and the strap is drawn. Accordingly, it is not required to provide special drive means for driving the drawing operation means, making the apparatus, as intended, compact overall.

In the above-described air bag apparatus, at least a portion of the intermediate portion in the longitudinal direction in the bag body may be supported by the curved portion of the vehicle.

In the above-described air bag apparatus, since at least a portion of the intermediate portion in the longitudinal direction in the bag body is supported by the curved portion of the vehicle, the bag body is inflated and expanded in a condition such that the bag body is supported along the curved portion of the vehicle so that the air bag can be applied to a wide area.

In the above-described air bag apparatus, the strap may be made of a member which absorbs energy through plastic or elastic deformation.

In the above-described air bag apparatus, when a load is applied to the strap extending within the bag body through the bag body, the strap is plastically or elastically deformed so that energy is absorbed. Accordingly, an multiplied effect can be given to the energy-absorbing performance due to the inflated and expanded bag body.

In the above-described air bag apparatus, a return-prevention member for preventing returning of the strap drawn by the drawing operation means in the reverse direction can be provided.

In the above-described air bag apparatus, for example, if the force drawing the strap in the direction opposite to that of the drawing operation is applied after the strap is drawn by the drawing operation means, the return motion of the strap in the reverse direction can be prevented by the return-prevention member. Accordingly, even after the drawing operation of the strap by the drawing operation means is completed, the strap is held linearly extended in the curved portion of the vehicle.

In the above-described air bag apparatus, the drawing operation means may be provided with a piston connected to the other end of the strap and a cylinder receiving the piston so as to move in the direction of the drawing operation.

In the above-described air bag apparatus, when the piston is slid within the cylinder in the direction of the drawing operation, the strap connected to the piston is drawn so that the strap is held in the curved portion linearly extended.

In the above-described air bag apparatus, the drawing operation means is provided with a vent passage introducing gas generated in the inflator to the inside of the cylinder close to the strap side and an opening portion connecting the vent passage to the inside of the bag body. Accordingly, the structure of the drawing operation means can be simplified.

In the above-described air bag apparatus, the drawing operation means extends said strap from the curved portion of the vehicle before said bag body is inflated and expanded. Accordingly, since these is no resistance to inflating the bag body, such as the housing case, the bag body is rapidly and smoothly expanded.

In the above-described air bag apparatus, the drawing operation means is provided with a valve that opens at a predetermined pressure in the opening.

In the above-described air bag apparatus, when the air bag is operated, the drawing operation of the strap is first performed so as to draw the bag body from the curved portion of the vehicle and thereafter the bag body can be inflated and expanded.

In the above-described air bag apparatus, the piston may have a taper portion in which the diameter thereof is gradually reduced in the direction opposite that of the drawing operation and the return-prevention member may be a stopper which formed substantially as a ring shape, is fitted to the taper portion in the smaller diameter side, moves relatively in the drawing operation direction with respect to the piston if the piston is moved in the direction opposite that of the drawing operation, and the diameter thereof is enlarged by contacting the taper portion so as to contact both an outer peripheral portion of the piston and an inner peripheral portion of the cylinder.

In the above-described air bag apparatus, when the piston is intended to be moved in the direction opposite that of the drawing operation after the piston is slid in the direction of the drawing operation in the inside of the cylinder so as to draw the strap, the stopper provided in the smaller diameter side of the taper portion of the piston is moved relatively from the smaller diameter side to the larger diameter side of the piston, that is, in the direction of the drawing operation, by inertia or by staying in position after the drawing operation. Accordingly, the stopper is made to contact the taper portion so as to enlarge its diameter and the stopper is in contact with the inner peripheral portion of the cylinder so that frictional force is generated between the stopper and the cylinder. Since the piston is stopped by this frictional force, the strap is held in the curved portion of the vehicle so as to be extended linearly even after the drawing operation of the strap by the drawing operation means is completed.

In the above-described air bag apparatus, the piston may be provided with a piston body connected to the other end portion of the strap and a cover member which has a large diameter portion disposed between the cylinder and the piston body so as to cover an outer peripheral portion of the piston body, a taper portion formed so as to gradually reduce its diameter in the direction opposite that of the drawing operation and having the stopper fitted in the side having a smaller diameter, and a flange portion disposed in an end portion in the direction of the drawing operation and being in contact with the inner peripheral portion of the cylinder so as to slide.

In the above-described air bag apparatus, a piston having improved accuracy and sliding performance can be easily achieved due to improvement in the accuracy and sliding performance of the cover member.

In the above-described air bag apparatus, the stopper formed substantially as a ring shape may have a notch in a part thereof. Accordingly, when the stopper is in contact with the taper portion, the stopper can easily enlarge its diameter so that friction force between the stopper and the cylinder can be increased.

In the above-described air bag apparatus, the stopper formed substantially as a ring shape may have an outer peripheral surface which can give surface contact with the inner peripheral surface of the cylinder. In accordance with this, frictional force between the stopper and the cylinder can be further increased.

In the above-described air bag apparatus, the piston may be provided with a groove portion formed so as to gradually increase the depth from the inner peripheral portion of the cylinder in the direction opposite that of the drawing operation and the return-prevention member may be a stopper ball which is formed as a spherical shape having a diameter smaller than the distance between the inner peripheral portion of the cylinder in the deepest portion of the groove portion and a bottom portion of the groove and larger than the distance between the inner peripheral portion of the cylinder in the shallowest portion of the groove, is disposed in an inside portion of the groove so as to rotate and, if the piston is moved in the direction opposite that of the drawing operation, is moved relatively in the direction of the drawing operation with respect to the piston so as to be in contact with the inner peripheral portion of the cylinder.

In the above-described air bag apparatus, when the piston is intended to be moved in the direction opposite that of the drawing operation after the piston is slid in the direction of the drawing operation within the cylinder so as to draw the strap, the stopper ball is moved relative with respect to the piston in the direction of the drawing operation so that the stopper ball is rotated from the deepest portion to the shallowest portion. In this case, since the depth in the shallowest portion of the groove is smaller than the diameter of the stopper ball, when the stopper ball is rotated to the shallowest portion of the groove, the stopper ball projects partially from the groove portion and is in contact with the inner peripheral portion of the cylinder so that frictional force is generated between the stopper ball and the cylinder. Since the piston is stopped by this frictional force, the strap is held in the curved portion of the vehicle linearly extended even after the drawing operation of the strap by the drawing operation means is finished.

In the above-described air bag apparatus, the piston may be provided with a small diameter portion formed so that a portion of the stopper ball projects to the outer peripheral portion having the groove portion, and a stopper ring may be fitted to the small diameter portion, the stopper ring being moved relatively in the direction of the drawing operation with respect to the piston if the piston is moved in the direction opposite that of the drawing operation so as to press the projecting portion of the stopper ball to the shallowest portion of the groove.

In the above-described air bag apparatus, when the piston is intended to be moved in the direction opposite that of the drawing operation after the piston performs the drawing operation of the strap, the stopper ring is moved relatively in the direction of the drawing operation with respect to the piston. Accordingly, the stopper ring presses the projecting portion of the stopper ball in the shallowest portion of the groove portion so that stopper ball can be brought into contact with the inner peripheral portion of the cylinder with certainty.

In the above-described air bag apparatus, an end of the cylinder disposed in the side of the direction of the drawing operation may be formed as an opening end and the return-prevention member is provided with an elastic member which is formed in the opening end of the cylinder so as to project in a direction crossing the direction of the drawing operation and is engaged with the piston reaching the opening end so as to remove the piston from the extending line of the cylinder, thereby preventing the piston from returning to the cylinder.

In the above-described air bag apparatus, when the piston is moved in the direction of the drawing operation and reaches the end close to the direction of the drawing operation of the cylinder so that the piston projects outwardly from the end close to the direction of the drawing operation, the elastic member engages with the piston so that an elastic force forcibly removes the piston from the extending line of the cylinder. Accordingly, the piston cannot return to the cylinder even when the piston is intended to be moved in the direction opposite that of the drawing operation. Therefore, the piston is prevented from being returned and the strap can be held in the curved portion of the vehicle so as to be linearly extended even after the drawing operation of the strap by the drawing operation means is finished.

BRIEF DESCRIPTION OF THE DRAWINGS

FIG. 1 is a schematic front view of an air bag apparatus in accordance with a first embodiment of the present invention as seen from an inside of a vehicle in a transverse direction.

FIG. 3 is a vertical cross-sectional view of a housing case portion which receives a bag body of the air bag apparatus in accordance with the first embodiment of the present invention in a retracted state.

FIG. 7 is an enlarged cross-sectional view which shows a structure of a piston of an air bag apparatus in accordance with a second embodiment of the present invention.

FIG. 11 is an enlarged cross-sectional view which shows a structure of a pisont of an air bag apparatus in accordance with a fourth embodiment of the present invention.

FIG. 17 is a side view which shows a structure of the piston of the air bag apparatus in accordance with the sixth embodiment of the present invention.

DESCRIPTION OF THE PREFERRED EMBODIMENTS

Figure 2:
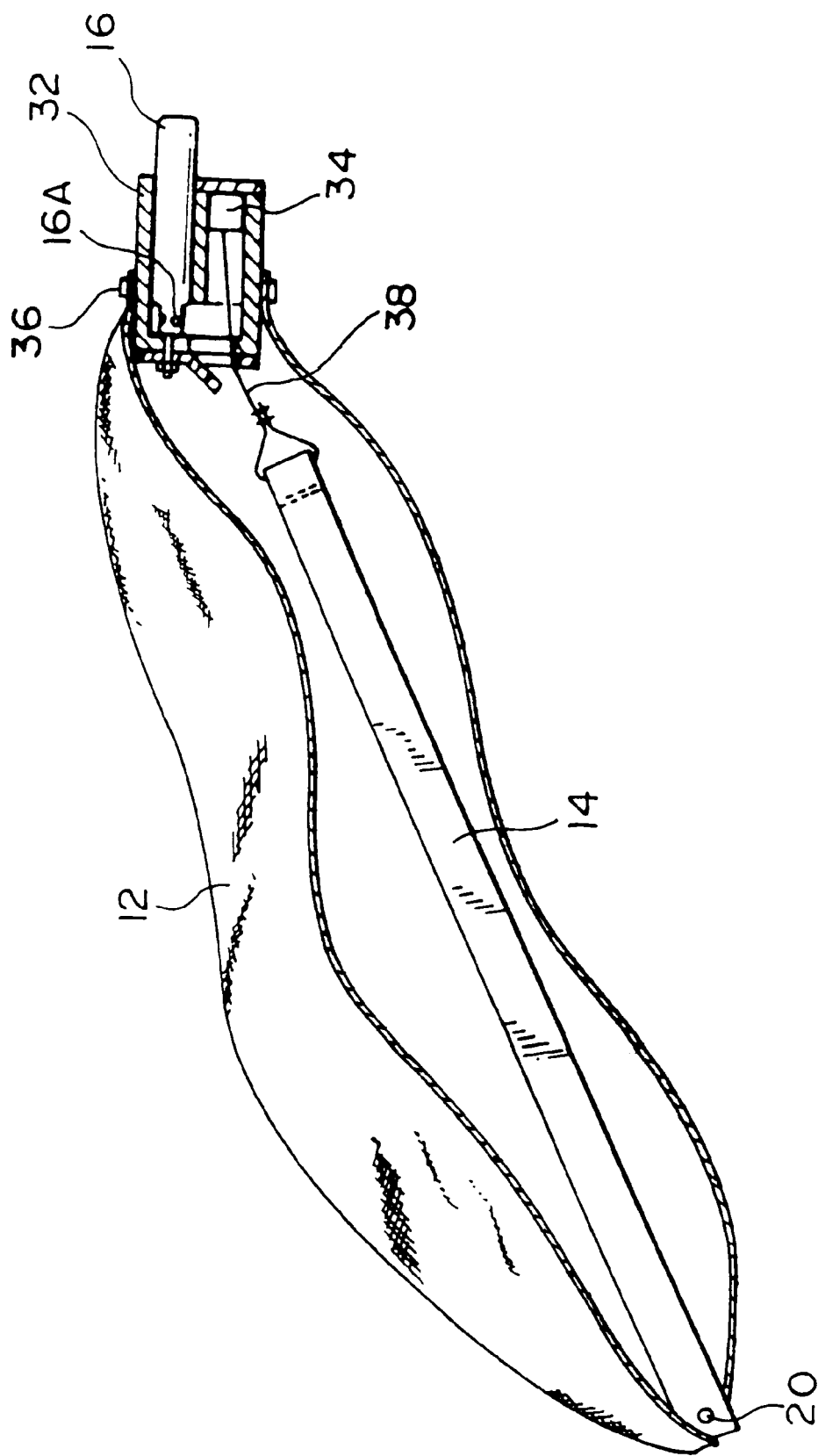
FIG. 2 is a vertical cross-sectional view which shows principal parts of the air bag apparatus in accordance with the first embodiment of the present invention.
Figure 4:
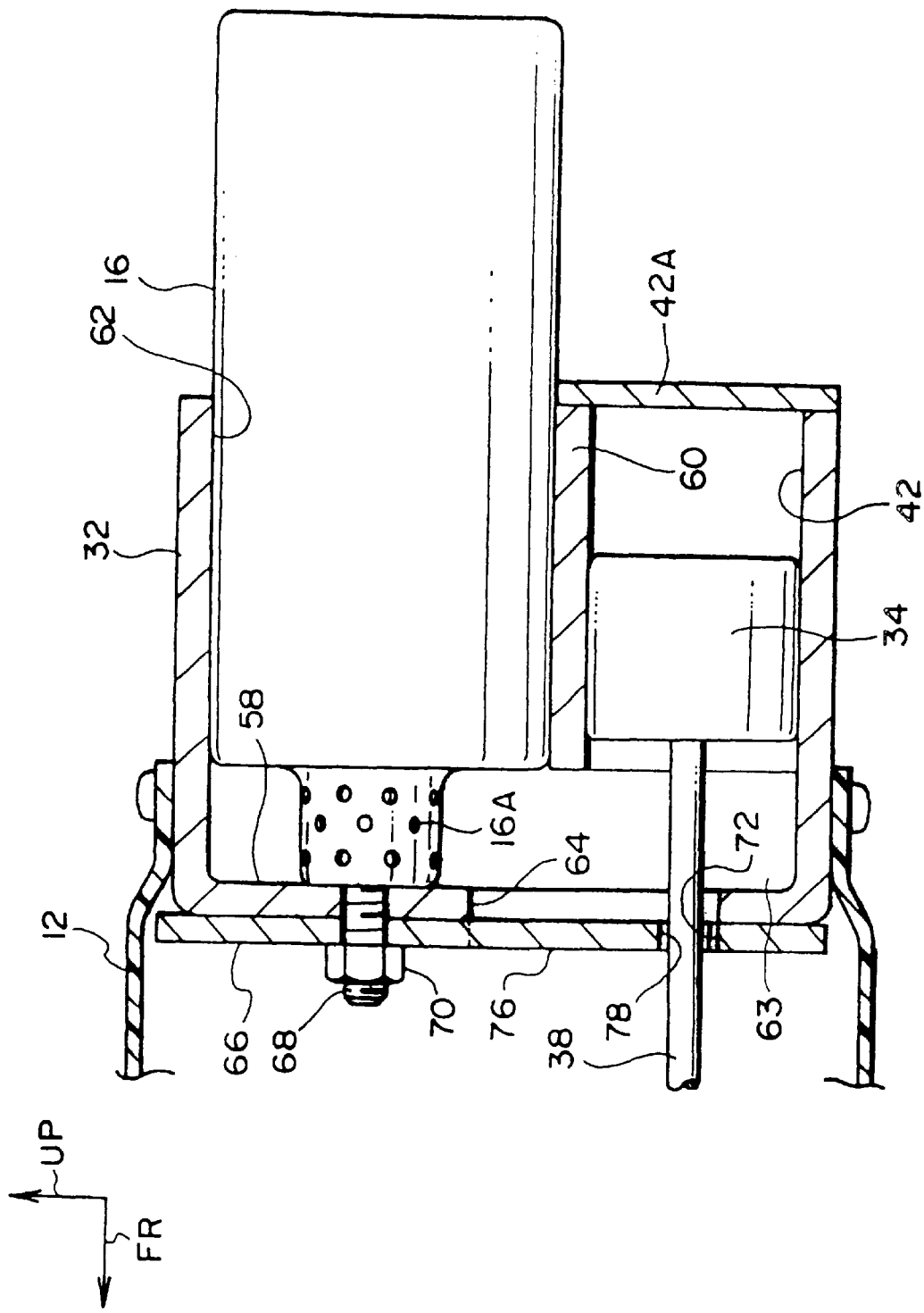
FIG. 4 is a vertical cross-sectional view which shows a part of a module case portion of the air bag apparatus in accordance with the first embodiment of the present invention.

A first embodiment of an air bag apparatus in accordance with the present invention is structured as shown in FIGS. 1 to 6. In each of the drawings, the front side of the vehicle is denoted by arrow FR, the inner side in the transverse direction of the vehicle is denoted by arrow IN, and the upper side of the vehicle is denoted by arrow UP.

The air bag apparatus 10 in accordance with the present invention is structured so that, if a collision in a side direction (a side collision) occurs with a vehicle, a bag body 12 and a strap 14 are inflated and expanded between a side portion of the vehicle and the head portion of the vehicle occupant from a retracted condition by activation of an inflator 16, thereby supporting the head portion of the vehicle occupant so as to absorb the kinetic energy of the head portion of the vehicle occupant.

The bag body 12 is formed as a long tubular shape in an inflated and expanded state. In the inside of the bag body 12, a strap 14 made of a belt-like member (similar to a belt-like member used for a flat belt and the webbing of a seat belt, wire and the like) is disposed. Accordingly, one end portion of the strap 14 is seamed to one end portion of the bag body 12 and a fixing through hole 20 for fixing is formed in the seamed end portion.

As shown by dotted lines in FIG. 1, the bag body 12 and the strap 14 in the retracted state having a longitudinal direction in the longitudinal direction of the vehicle are disposed along a front pillar 22 and a roof side 24 in a curved condition. The end portion of the bag body 12 and the strap 14 having the fixing hole 20 are disposed in the front end of the vehicle and, as shown in the drawing, are fixed to an inner panel 26 of the front pillar 22 (the inner panel being below mentioned) by a bolt 28 so as to rotate. The end portion of the bag body 12 and the strap 14 in the front side of the vehicle are accordingly mounted at the vehicle body.

In contrast to this, an inflator module is provided in an inner panel of the roof side 24 at a position slightly more toward the rear side of the vehicle than the center pillar 30. The inflator module is provided with a module case 32 mounted at the roof side 24. The module case 32 is formed in the shape of a container as shown in FIGS. 2 and 4 to 6 and is provided with the inflator 16 and a piston 34 serving as a part of drawing operation means inside thereof.

An end opening portion of the bag body 12 opened to the rear side of the vehicle is fitted to and communicates with an outward peripheral surface of the front end side of the vehicle in the module case 32 and an annular retainer 36 is wound around the outer periphery of the end opening portion of the bag body 12 so that the end opening portion of the bag body 12 is fixed between the module case 32 and the retainer 36 so as to maintain air-tightness.

The strap 14 disposed within the bag body 12 forms a circle by seaming the end portion provided with the fixing hole 20 and the opposite end with folding back at a required length. Further, one end of a wire 38 is passed through the circle and a free end is fixed to an intermediate portion of the wire 38 so as to form a circle, thereby connecting the wire 38 to the strap 14. The other end of the wire 38 is fixed to the piston 34 within the module case 32.

As mentioned above, the bag body 12 having one end which is fixed to the inner panel 26 of the front pillar and the other end which is fixed to the module case 32, and the strap 14 disposed within the bag body 12 and having one end which is fixed to the inner panel 26 and the other end which is fixed to the piston 34 through the wire 38 are received within the housing case 44 retracted under the retracted condition shown in FIG. 3. The housing case 44 is made of a thin metal or synthetic resin material such as soft steel or aluminum which can be deformed. The housing case 44 is formed as a long shape curved along the roof side 24 and the front pillar 22 and has a vertical cross-section in the longitudinal direction of rectangular cylindrical shape. The housing case 44 is disposed between the inner panel 26 in the roof side 24 and the front pillar 22 and garnish (a trim member) 46. An opening 48 is formed on the case wall opposing to the garnish 46 in a peripheral wall of the housing case 44 so as to be disposed along the longitudinal direction of the housing case 44. A notch 50 is linearly formed on the garnish 46 so as to oppose the opening 48. The housing case 44 surrounds the bag body 12 so the bag body does not exit from the opening 48.

A plurality of brackets 52 is provided along the longitudinal direction of the housing case 44 at a predetermined distance. The bracket 52 has one end fixed to a case wall 54 opposing the opening 48 of the peripheral wall of the housing case 44 and the other end fastened to the inner panel 26 by a bolt 56. To an inner bottom surface of the housing case 44, the bag body 12 is linearly fixed in the longitudinal direction thereof.

As mentioned above, the housing case 44 housing the bag body 12 is mounted at the vehicle body. As mentioned below, by drawing the end portion of the strap 14 in the rear side of the vehicle and inflating the bag body 12, the housing case 44 is elastically or plastically deformed so as to widen the opening 48 and the garnish 46 is elastically or plastically deformed through the notch 50 so as to be expanded in the transverse direction so that the bag body 12 and the strap 14 can inflate and expand toward the lower portion of the vehicle cabin.

As mentioned above, the inflator module which is arranged in order to inflate and expand the bag body 12 and the strap 14 has a bottom wall 58 in a side of the bag body 12 and the cylindrical module case 32 opening to the opposite side thereof, and a partition wall 60 is formed inside thereof. The upper portion of the partition wall 60 within the module case 32 is formed as an inflator receiving portion 62 in which the inflator is received.

The inflator 16 is filled with a gas generation material. When a sensor, not shown, detects sudden speed deceleration of the vehicle or a side collision or the like, the inflator 16 is activated, pressurized gas (gas pressure) is generated by the gas-generation material, and gas is injected from a gas injection opening 16A provided in the inflator 16 in the front side of the vehicle.

The lower portion of the partition wall 60 within the module case 32 is formed as a cylinder 42 serving as a part of drawing operation means having a circular cross-section and receives the piston 34 in a sliding manner. An end of the cylinder 42 in an opposite side of the bag body 12 is closed by a bottom portion 42A.

A vent passage 63 for introducing gas injected by the inflator 16 to the cylinder 42 is formed in a front portion within the module case 32 and an opening portion 64 is formed in the bottom wall 58 so as to communicate with the vent passage 63 with the inner portion of the bag body 12. Further, a plate 66 is disposed in the outer side of the bottom wall 58.

Figure 5:
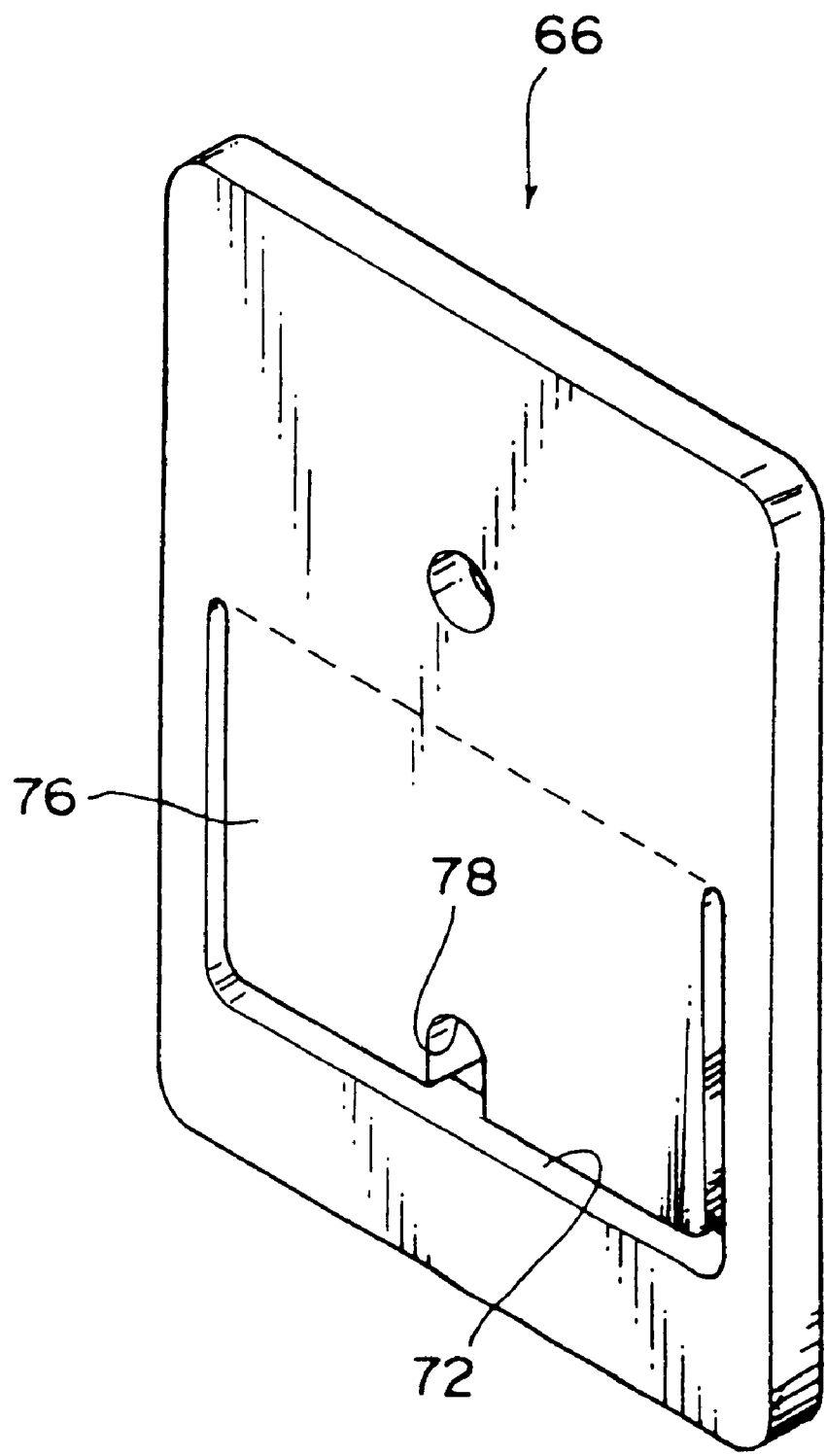
FIG. 5 is a perspective view which shows a plate applied to the module case of the air bag apparatus in accordance with the first embodiment of the present invention.

The plate 66 is fixed by a nut 70 to a male cord portion 68 passing through the plate 66 and the bottom wall 58 of the module case 32 provided in the inflator 16. As shown in FIG. 5, a rectangular vent hole 72 is formed in a central portion of the plate 66. The vent hole 72 corresponds to the opening portion 64 of the bottom wall 58, thereby communicating with the inner portion of the module case 32 with the inner portion of the bag body 12. Further, a rectangular valve 76 is formed in the plate 66. The valve 76 is formed in correspondence to the vent hole 7, continuously formed from an upper end portion of the vent hole 72 to lower end portion thereof and, under ordinary conditions, the vent hole 72 is closed by the valve 76 with a predetermined gap.

The valve 76 is structured so as to be bent upwardly by a predetermined pressure (a state shown in FIG. 6) and the vent hole 72 can be opened by bending the valve 76.

Further, a notch 78 is formed in a lower end of the valve 76. The notch 78 is formed in correspondence to the wire 38 for connection engaged with the piston 34. The wire 38 passes through the notch 78 and is connected to the strap 14. The notch 78 opens downward so that, when the valve 76 is bent upwardly, the valve 76 is not moved together with the wire 38.

Next, an operation and motion of the air bag apparatus structured above in accordance with the present invention will be explained below.

At first, when high acceleration exceeding a predetermined value is applied to the vehicle, the acceleration sensor detecting the value activates the inflator 16 so as to inject gas. Gas is introduced from the gas injection hole 16A to the opening portion of the cylinder 42 in a condition limited by the closed valve 76, thereby pressing the piston 34 to the cylinder bottom portion 42A.

The wire 38 is drawn by the motion of the piston 34 and the strap 14 connected to the wire 38 is drawn to the module case 32. Then, the strap 14 is brought out from the housing case 44 together with the bag body 12, enclosing the strap 14 therein and not sufficiently inflated and expanded, and comes out through the notch in the garnish 46 and is extended linearly between the bolt 28 of the front pillar 22 and the module case 32 of the inflator module in the roof side 24 so as to obliquely cross the upper portion of the vehicle window. At this time, the strap 14 is drawn rapidly and without hindrance by the operation inflating the bag body 12. Further, as the strap 14 is drawn before the bag body 12 is inflated and expanded, the bag body 12 which is still in an uninflated state can be brought out from a narrow opening 48 of the housing case 44.

Figure 6:
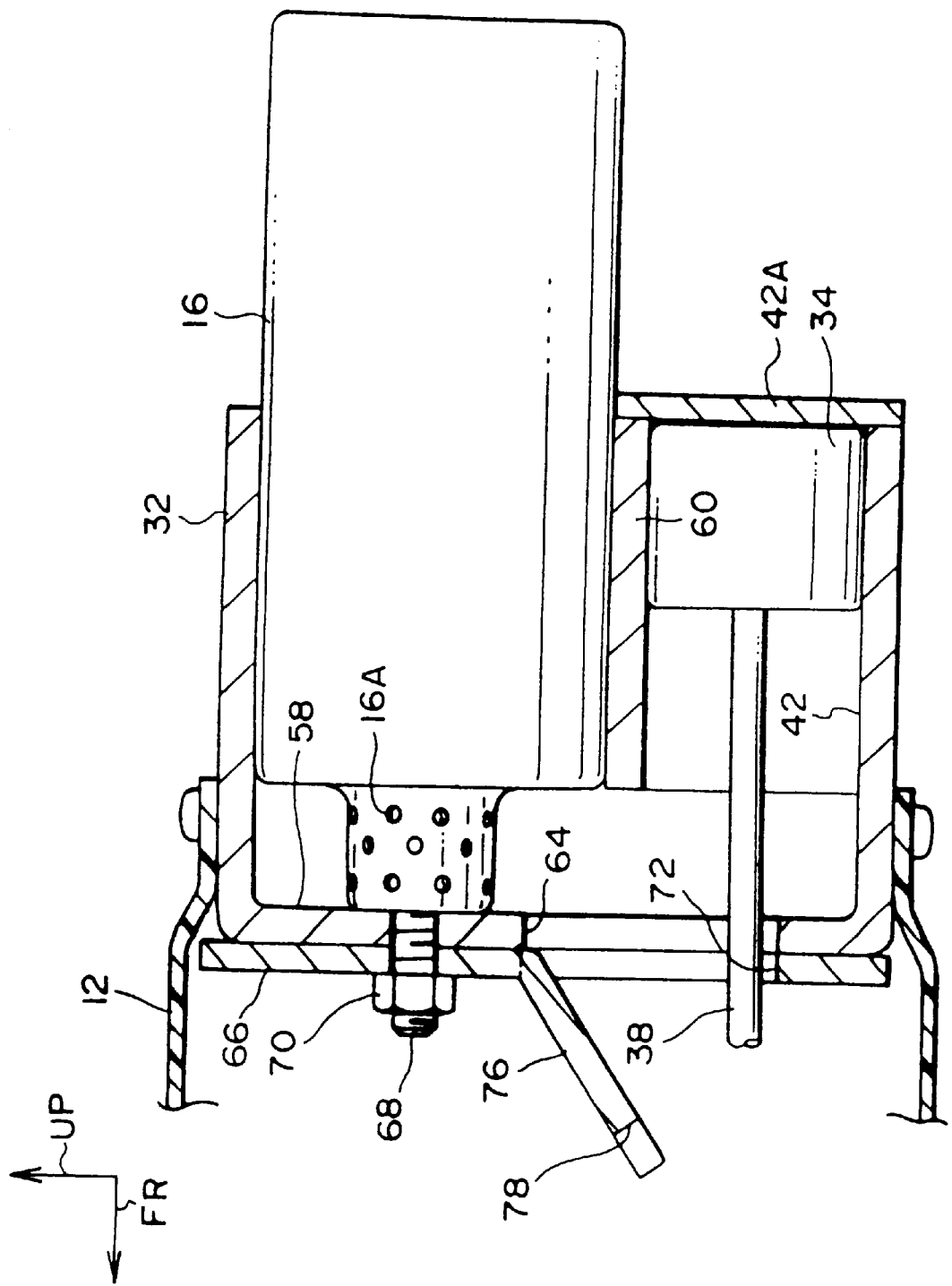
FIG. 6 is a vertical cross-sectional view corresponding to FIG. 4 which shows the module case portion of the air bag apparatus in accordance with the first embodiment of the present invention in a state where a valve of the module case portion is bent (the state where a vent passage is open).

Next, when the piston 34 is in contact with the cylinder bottom portion 42A, internal pressure within the module case 32 is increased by the pressure of the gas injected by the gas injection opening 16A, all internal pressure (that is, gas pressure) is applied to the valve 76 and the valve is bent in the upper end portion to the bag body 12 (a state shown in FIG. 6). In this state, since an opening area of the vent hole 72 is increased, gas flows rapidly through the vent hole 72 into the bag body 12. Further, since the bag body 12 is drawn linearly to the expanded position by the strap 14 at this time and there is no resistance to inflating the bag body 12, such as the housing case 44 or garnish 46, the bag body 12 is further rapidly and smoothly expanded.

Accordingly, since most of the gas pressure can be used for moving the piston 34, until the piston 34 is in contact with the cylinder, the strap 14 and the bag body 12 can be drawn in a linear direction with certainty. Further, since all gas pressure is used for opening (bending) the valve 76 when the piston 34 is in contact with the bottom portion 42A, a special structure is not required for opening the valve 76. Moreover, a special structure is not required for matching the timing of drawing the bag body 12 and expanding the bag body 12 so as to open the valve 76 after gas pressure has completely drawn the bag body 12 so that the bag body 12 can be expanded in a linearly drawing state by a simple structure.

Even if the timing of drawing the strap 14 is added to the timing of expanding the bag body 12 in the air bag apparatus, the drawing operation of the strap 14 and the bag body 12 is not prevented by the inflating operation of the bag body 12 since the strap 14 is disposed within the bag body 12. Accordingly, in order to extend to a predetermined position, it is not required that the volume of the inflator 16 be increased.

Since the bag body 12 inflated and expanded in the above manner has a total length longer than the distance between the bolt 28 of the front pillar 22 and the module case 32, the bag body may be bent in an intermediate portion thereof. However, since the strap 14 is linearly extended within the bag body 12, the bag body 12 is limited by the strap 14 and the bag body 12 cannot be put out of position from the predetermined expanding position in the vehicle window. Further, since the bag body 12 is linearly fixed to the housing case 44 along the longitudinal direction thereof, as shown in FIG. 1, the bag body 12 is inflated greatly and expanded from the front pillar 22 and the roof side 24 to the window side to substantially an oval shape in the side surface (a triangle shape in the side surface can be allowed).

If the head portion of the vehicle occupant strikes against the bag body 12 inflated and expanded in this manner, kinetic energy thereof can be absorbed excellently by the air cushion formed by the bag body 12. Further, even when the head portion and the like strike against the strap 14 through the bag body 12, the head portion is supported by the strap 14 and energy is absorbed. In addition to this, if the strap 14 itself is made of an energy-absorbing material by plastic or elastic deformation (for example, a member in which energy is absorbed by a cord of the strap 14 which is cut when a tensional force exceeds a predetermined level is applied or a strap member made of an elastic material), the strap itself can absorb the energy of the head portion excellently.

In this embodiment, the structure is described as one in which the plate 66 having the valve 76 is mounted at the module case 32. It may be appreciated, however, that the valve 76 is formed simply in the opening portion 64 in the module case 32.

Further, the bag body 12 may be structured so that both ends thereof are connected with the bolt 28 and the module case 32 and the intermediate portion thereof is not fixed at all. Still further, it may be structured so that a portion of the bag body 12 is fixed to the predetermined portion of the front pillar 22 and the roof side 24 at a single portion or a plurality of portions so that the bag body 12 is inflated greatly and expanded from the portion of the front pillar 22 and the roof side 24 to the window side. Furthermore, in this case, a auxiliary member extending along the inner surface of the bag body 12 for inflating the bag body 12 in a predetermined shape may be disposed within the bag body 12.

Still further, in the present embodiment, the inflator module (module case 32) is arranged at the rear end of the bag body 12, that is, slightly more rearward in the vehicle than the center pillar 30 in the roof side 24. However, the inflator module (module case 32) may be mounted at the front end of the bag body 12 (that is, the position of the module case 32 and the position of the bolt 28 are respectively inverted in FIG. 1).

Furthermore, the extended state may be kept after the strap 14 is drawn by another drawing operation means for drawing the strap 14 such as another inflator module which is different from the inflator module for inflating and expanding the bag body 12 or a drive means like a motor. In this structure, the strap 14 is independently drawn by the drawing operation means and the bag body 12 is independently inflated and expanded by the inflator module.

Next, another embodiment of the present invention will be explained below. In each of the embodiments that follow, elements basically the same as those in the first embodiment are denoted by the same reference numbers and an explanation thereof is omitted.

FIG. 7 shows a cross-sectional view in which a piston 101 serving as a part of drawing operation means of an air bag apparatus 90 in accordance with a second embodiment of the present invention is enlarged. As shown in the drawing, in accordance with the present embodiment, the piston 101 is different from the piston 34 and has a piston body 100 and a cover 108. The piston body 100 has a rear end portion 102 having a diameter smaller than the inner diameter of the cylinder 42 and a gap is formed between the piston body 100 and the cylinder 42. Further, a taper portion 104 is formed in the intermediate portion in the axial direction. In the taper portion 104, the diameter of the piston 100 is gradually reduced toward the front section (that is, arrow FR in FIG. 7).

An area from the front end portion (that is, the end portion in the direction indicated by arrow FR in FIG. 7) of the taper portion 104 in the piston body 100 to a front end portion (that is, an end portion in the direction indicated by arrow FR in FIG. 7) of the piston body 100 is formed as a small diameter portion 106 having a diameter smaller than that of the rear end portion of the piston body 100.

Further, an outer peripheral portion of the piston body 100 is covered by a cover 108 made of a resin. The cover 108 has a large diameter portion 110 in the rear end and has an outside diameter which enables the cover to slide within the cylinder 42. In a portion corresponding to the taper portion 104 of the piston body 100 in the cover 108, a taper portion 112 in which the outer and inner diameters are gradually reduced toward the front side (that is, in the direction indicated by arrow FR in FIG. 7) similarly to the piston body 100 is formed continuously from the large diameter portion 110. Further, in a portion corresponding to the small diameter portion 106 of the piston 100 in the cover 108, a small diameter portion 114 having inner and outer diameters of the same size in the front end portion of the taper portion 112 is formed continuously from the taper portion 112. Accordingly, a gap (a space) having a predetermined size is formed between the taper portion 112 and the small diameter portion 114, and the inner peripheral portion of the cylinder 42. A flange portion 116 extending uniformly toward the outer side of the small diameter portion 114 in the radial direction is formed in the front end of the small diameter portion 114. The flange portion 116 has an outer diameter of the same size as the outer diameter of the large diameter portion 110 and is structured so as to slide within the cylinder 42. When gas pressure injected from the inflator 16 is applied to the flange portion 116, the cover 108 is moved toward the rear end (that is, in a direction inverse that indicated by arrow FR in FIG. 7) of the cylinder 42 together with the piston 100.

Figure 8:
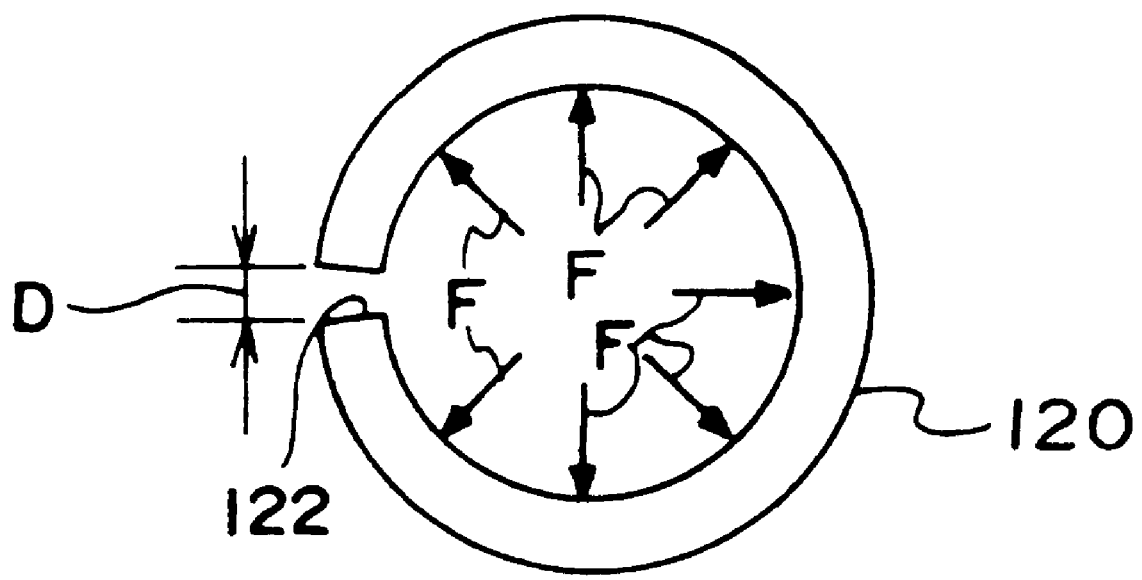
FIG. 8 is a plan view which shows the shape of a stopper ring (a stopper).

Still further, a stopper ring 120 serving as a return-prevention member and as a stopper is arranged in the outer side of the small diameter portion 114 in the cover 108 in the radial direction. In this structure, the stopper ring 120 is formed as a ring shape made of an elastic metal and has a circular cross section in the peripheral direction as shown in FIG. 8 (refer to FIG. 7). The stopper ring 120 may be made of different materials having an elastic characteristic from metal, for example, it may be made of a resin material. The stopper ring 120 is structured so that the inner diameter size is larger than the outer diameter size and so that the outer diameter size is capable of sliding the stopper ring within the cylinder 42 in a manner similar to the large diameter portion 110 of the cover 108, and the stopper ring 120 is freely fitted to the small diameter portion 114 of the cover 108. Accordingly, the stopper ring 120 can freely move between a portion where the outer diameter of the taper portion 112 conforms to the inner diameter of the stopper ring 120 and the rear end portion of the flange portion 116. A notch portion 122 is formed in the stopper ring 120. Accordingly, when load F is applied to the stopper ring 120 from the inside of the radial direction, distance D of the notch portion 122 is enlarged so that the diameter of the stopper ring 120 becomes larger under ordinary conditions (that is, a condition where load F is not applied).

When the piston 101 receives the gas pressure injected from the inflator 16, the piston 101 is moved toward the rear end of the cylinder 42 (that is, in the direction inverse that indicated by arrow FR in FIG. 7) together with the stopper ring 120. Accordingly, the strap 14 is drawn and the bag body 12 is brought into an extended condition (refer to FIGS. 1 and 2).

In this state, if gas pressure acting on the piston 101 is reduced or the gas supply to the piston 101 ceases or the head portion of the vehicle occupant presses the bag body 12 in the expanded condition, the piston 101 is drawn and moved forward (that is, in the direction indicated by arrow FR in FIG. 7) by the strap 14.

Figure 9:
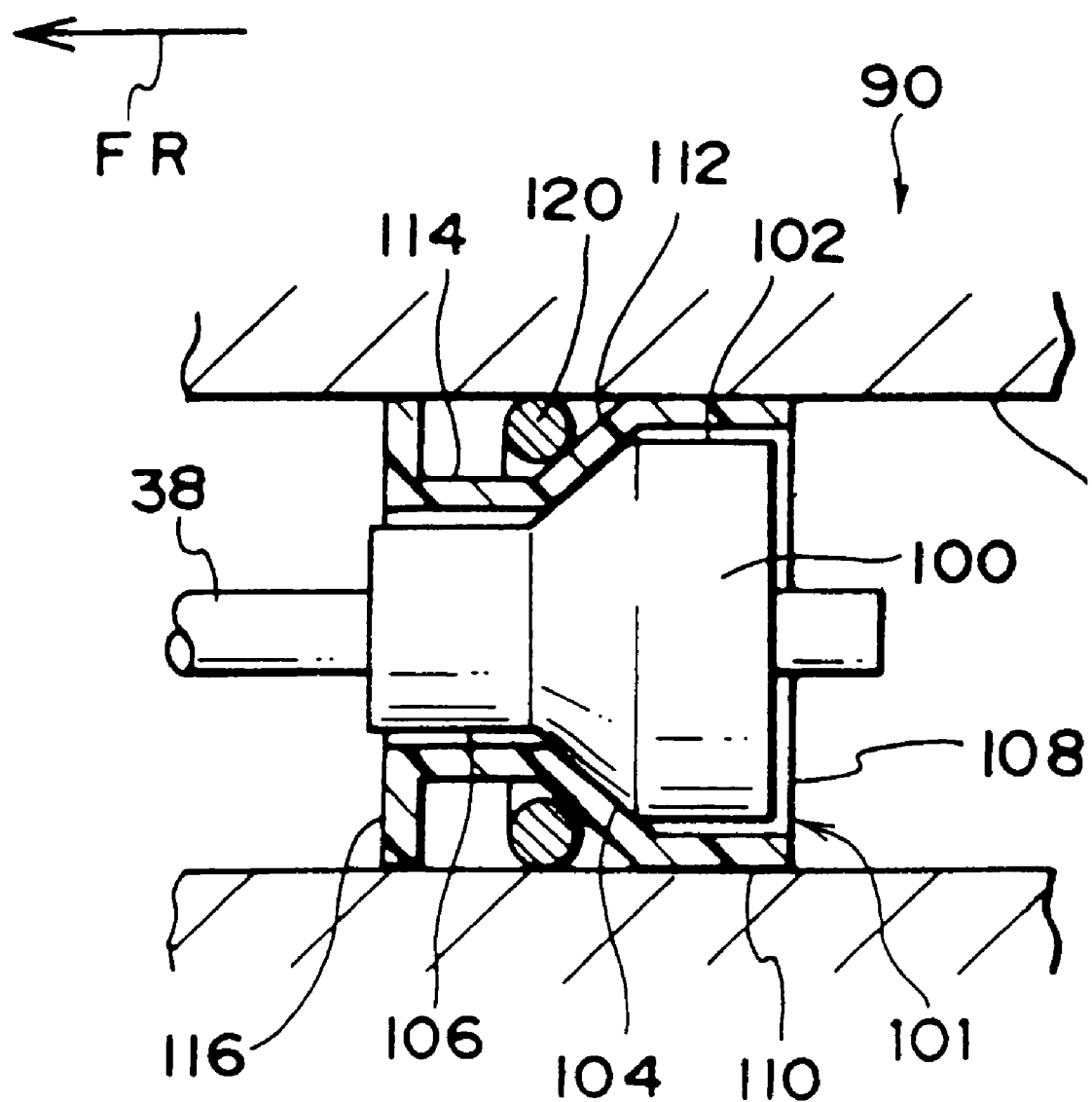
FIG. 9 is an enlarged cross-sectional view corresponding to FIG. 7 which shows a state where a piston is stopped by the stopper.

In this structure, the stopper ring 120 is freely fitted to the small diameter portion 114 of the cover 108 so that the stopper ring 120 can be freely moved between the portion where the outer diameter of the taper portion 112 conforms to the inner diameter of the stopper ring 120 and the rear end portion of the flange portion 116. Accordingly, even when the piston body 100 is moved together with the cover 108 by being drawn by the strap 14, the stopper ring 120 is moved relatively to the taper portion 112 with respect to the piston 101 by inertia or keeping position after the drawing operation. Further, when the stopper ring 120 is moved relatively to the taper portion 112 by the motion of the piston 101 and the inner peripheral portion of the stopper ring 120 is brought into contact with the outer peripheral portion of the taper portion 112 as shown in FIG. 9, the diameter of the stopper ring 120 is enlarged by the pressing force of the taper portion 112. Then, the outer peripheral portion of the stopper ring 120 is brought into contact with the inner peripheral portion of the cylinder 42 so that a frictional force between the outer peripheral portion of the stopper ring 120 and the inner peripheral portion of the cylinder 42 is increased so as to stop the stopper ring. In accordance with the wedge effect by the stopper ring 120, the piston 101 is stopped, thereby keeping the strap 14 in the extended state (refer to FIGS. 1 and 2).

Therefore, in accordance with the present air bag apparatus 90, in addition to the above-described effect obtained by the strap 14, wherever the piston 101 is positioned within the cylinder 42, the piston 101 can be immediately stopped after moving to the front direction (that is, the direction of the arrow FR in FIG. 7) so that the strap 14 can be maintained in the extended state.

Next, a third embodiment in accordance with the present invention will be explained below.

Figure 10:
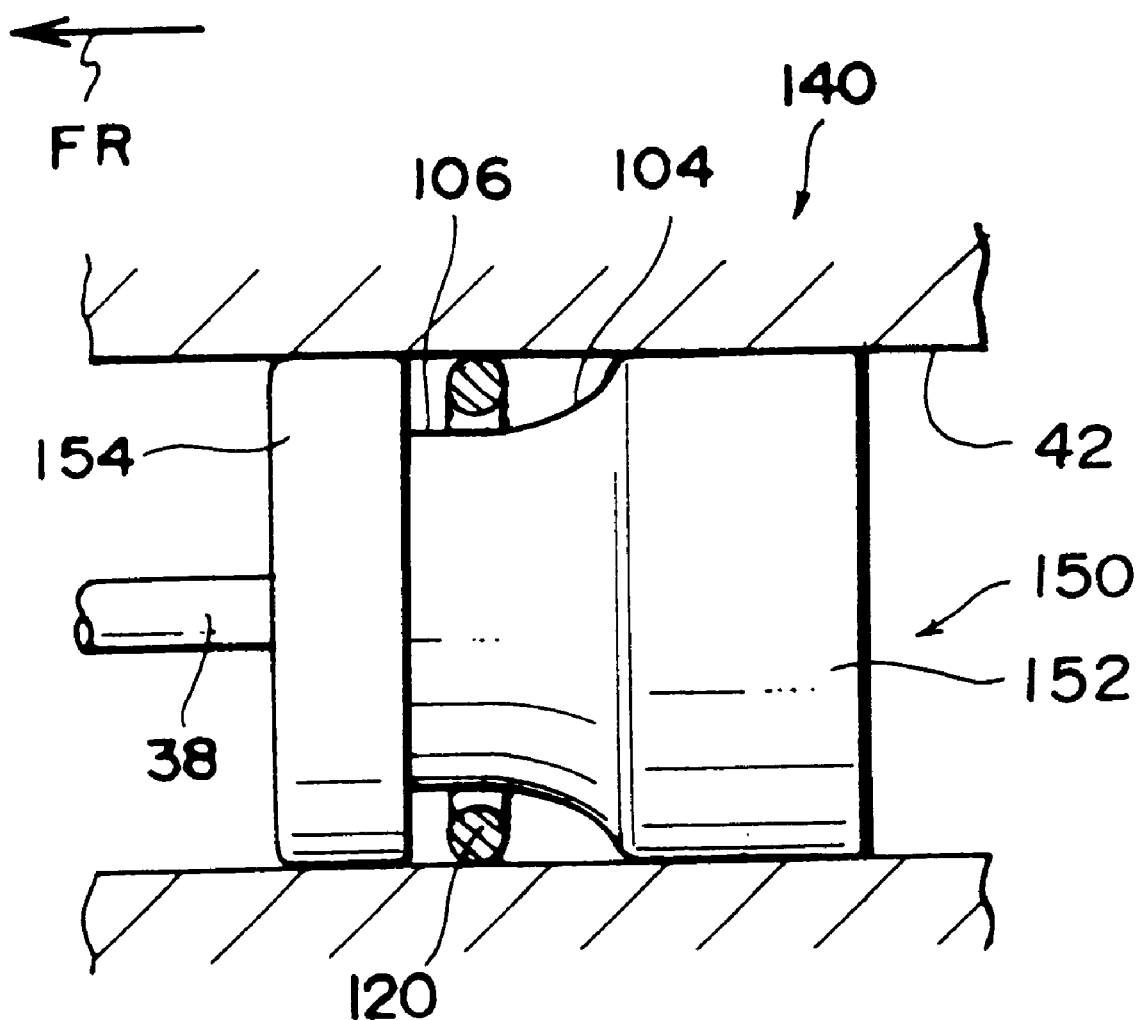
FIG. 10 is an enlarged cross-sectional view which shows a structure of a piston of an air bag apparatus in accordance with a third embodiment of the present invention.

FIG. 10 is an enlarged cross-sectional view in which a piston 150 serving as a part of drawing operation means of an air bag apparatus 140 in accordance with the third embodiment of the present invention is enlarged. As shown in this figure, the piston 150 has an outer diameter of a rear end portion 152 such that the piston can be slid within the cylinder 42. In the front end of the small diameter portion 106 of the piston 150 is formed a flange portion 154 having an outer diameter similar to the case of the rear end portion 152 such that the piston can be slid within the cylinder 42. Accordingly, the piston 150 of the air bag apparatus 140 in accordance with the present embodiment has substantially the same outside size as the cover 108 in the second embodiment in spite of the taper portion 104 being formed as a circular arc. Therefore, this structure can obtain an effect similar to the above-described second embodiment.

Next, a fourth embodiment in accordance with the present invention will be explained below.

Figure 12:
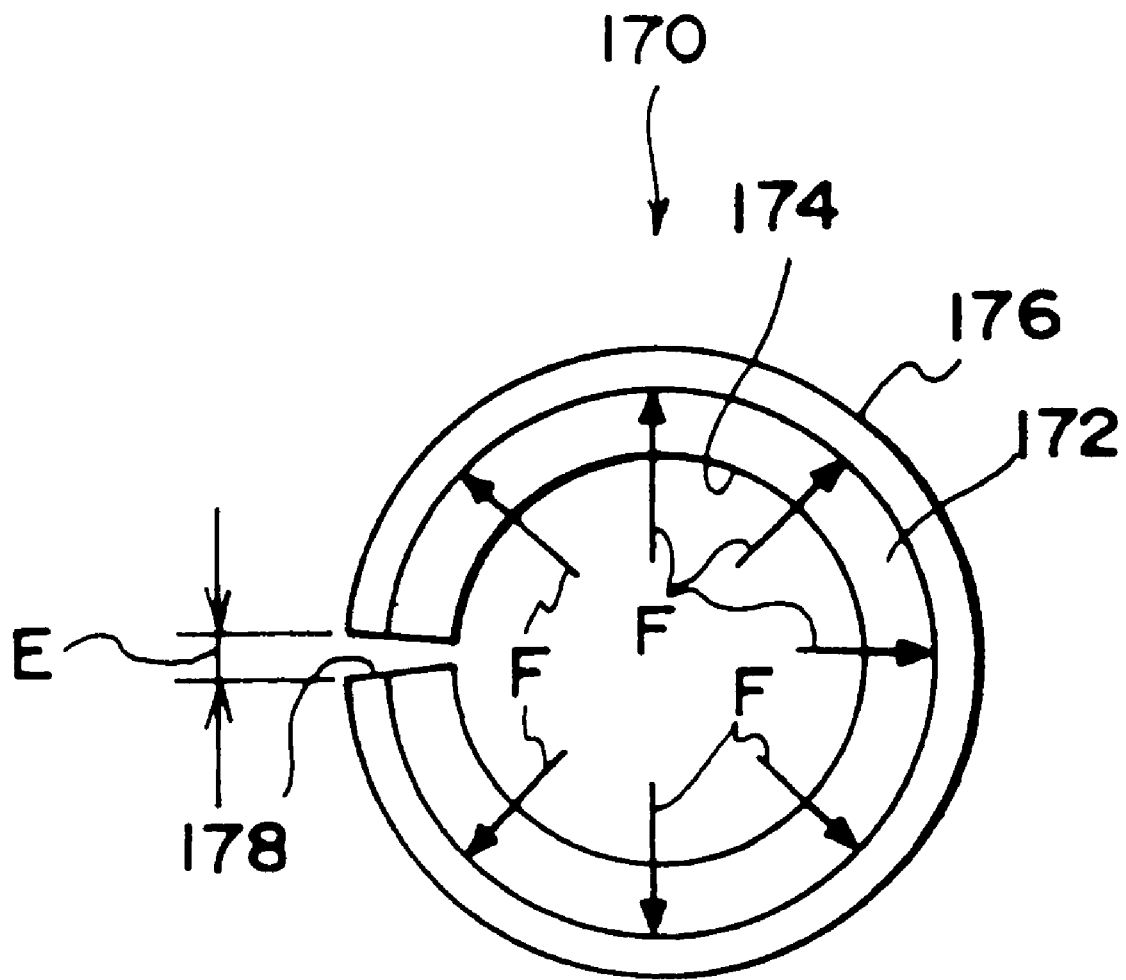
FIG. 12 is a plan view which shows a shape of a stopper.

FIG. 11 is an enlarged cross-sectional view in which a close portion to the piston 150 serving as a part of drawing operation means of an air bag apparatus 160 in accordance with the fourth embodiment of the present invention is magnified. As shown in this figure, a stopper 170 serving as a return-prevention member and as a stopper made of elastic resin material is provided in the small diameter portion 106 of the piston 150. The different elastic material can be used for the material applied to the stopper 170, for example, an elastic metal can be applied. The stopper 170 is formed as a cylindrical shape having a bottom portion 172 in the front end thereof (an end portion in the direction indicated by arrow FR in FIG. 11) as shown in FIG. 12 and the bottom portion 172 is provided with a circular hole 174 through which the small diameter portion 106 of the piston 150 extends. The outer diameter of the cylindrical portion 176 of the stopper 170 is the same as the outer diameter of the flange portion 154 or the rear end portion 152 so as to slide the stopper within the cylinder 42. A notch portion 178 serving as a return-prevention member and as a stopper is formed on the cylindrical portion 176 and the bottom portion 172 of the stopper 170. When load F is applied to the cylindrical portion 176 of the stopper 170 from the inside in the radial direction, distance E of the notch portion 178 is enlarged so that the diameter of the stopper 170 becomes larger than that in the ordinary state (that is, the state where load F is not applied).

A C ring 179 is disposed between the cylindrical portion 176 of the stopper 170 and the small diameter portion 106. The C ring 179 has basically the same shape as the stopper ring 120 in the second embodiment. However, the outer diameter thereof is equal to the inner diameter of the cylindrical portion 176, differing from that of the stopper ring 120.

Accordingly, in the present embodiment, when the inner peripheral portion of the C ring 179 is brought into contact with the outer peripheral portion of the taper portion 104, the diameter of the C ring 179 is enlarged by the pressing force from the taper portion 104 and the C ring 179 presses the cylindrical portion 176 of the stopper 170 from the inside thereof. Accordingly, frictional force between the outer peripheral portion of the cylindrical portion 176 and the inner peripheral portion of the cylinder 42 is increased and the piston 150 is stopped so that the bag body 12 is kept in the extended state (refer to FIGS. 1 and 2). The present embodiment has a structure different from the above-described structure in that the pistons 100 and 150 are stopped by the frictional force between the stopper ring 120 and the cylinder 42, and has a structure of surface contact between the cylindrical portion 176 and the cylinder 42, thereby obtaining a large braking force so that the piston 100 can be further stopped with certainty.

In the above second and fourth embodiments, the cross-sectional shape of the stopper ring 120 and the C ring 179 is formed as a circular shape. However, the cross-sectional shape of the stopper ring 120 and the C ring 179 is not limited to the circular shape. For example, the cross-sectional shape may be formed as a triangular shape or a trapezoidal shape such that the inner peripheral portion of the stopper ring 120 is in surface contact with the taper portion 104 and 112 and the outer peripheral portion of the stopper ring 120 is in surface contact with the inner peripheral portion of the cylinder 42. In this case, since the contact area with the taper portion 104 and 112 and the cylinder 42 is larger than in the case of the circular crosssection, the frictional force becomes larger and the braking force is increased.

Next, a fifth embodiment in accordance with the present invention will be explained below.

Figure 13:
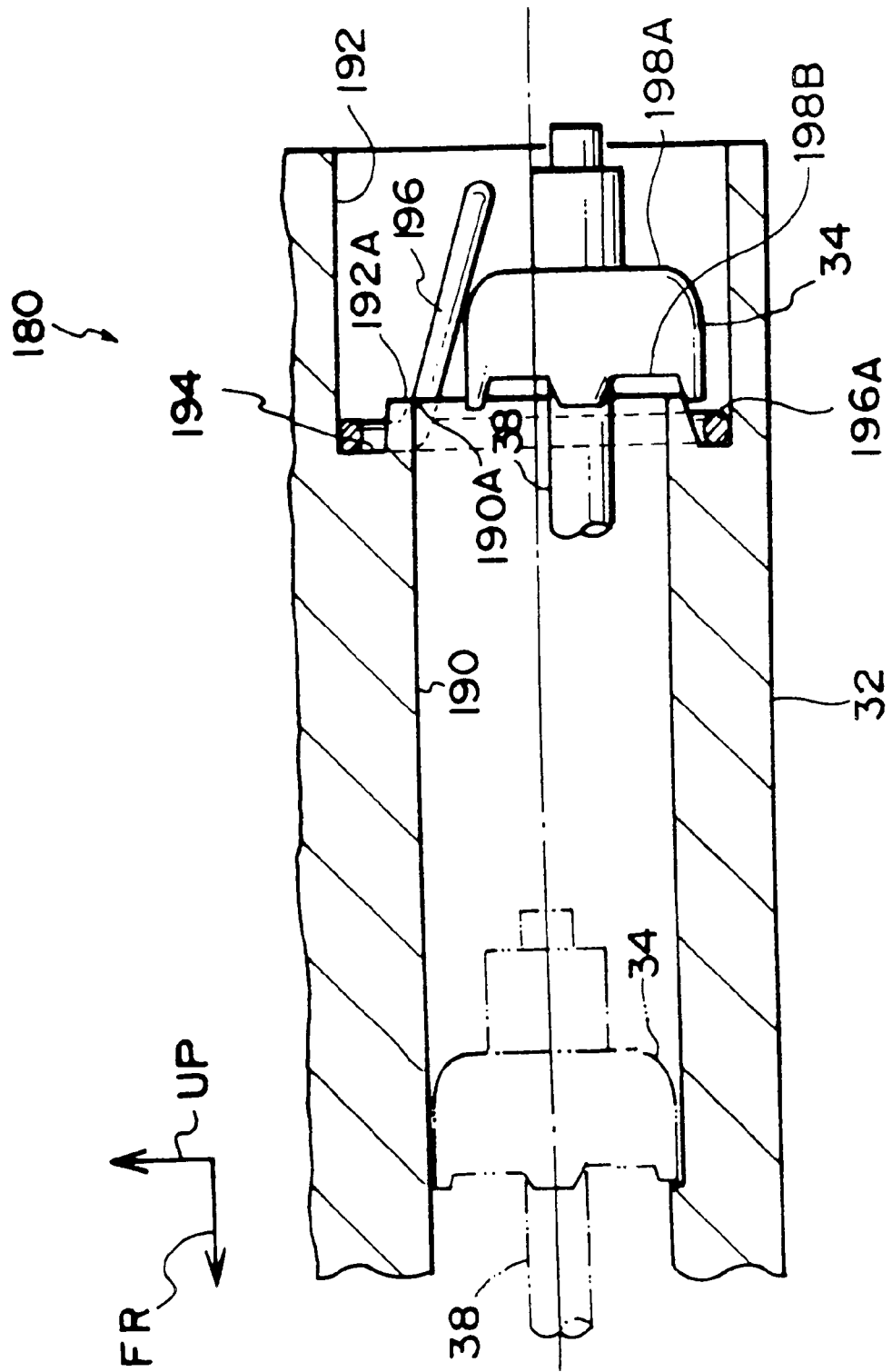
FIG. 13 is an enlarged cross-sectional view which shows a structure of a cylinder of an air bag apparatus in accordance with a fifth embodiment of the present invention.
Figure 14:
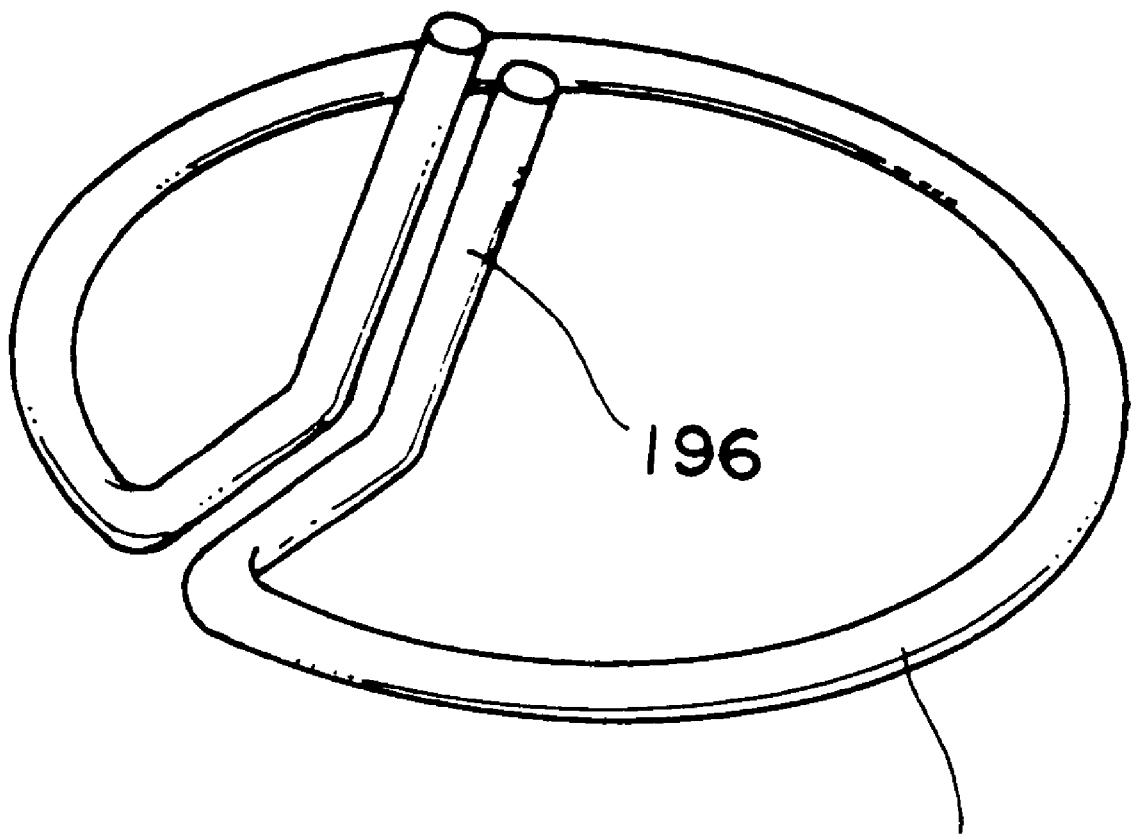
FIG. 14 is a perspective view which shows a external appearance of a spring as a return-prevention member.

FIG. 13 shows a cross section of a cylinder 190 serving as drawing operation means of an air bag apparatus 180 in accordance with the fifth embodiment of the present invention. As shown in this figure, a rear end portion 190A (that is, the end opposite to the direction indicated by arrow FR in FIG. 13 and the end portion in the drawing direction of the cylinder 190) of the cylinder 190 serving as drawing operation means formed in the module case 32 is formed as an open end. The rear end portion 190A is open to a bottom portion 192A in a hole 192 which has an inner diameter formed in the module case 32 larger than the inner diameter of the cylinder 190. An annular groove 194 is formed in the bottom portion 192A in the periphery of the rear end portion 190A in the cylinder 190 and a spring 196 serving as a return-prevention member is fitted. The spring 196 has elasticity and, as shown in FIG. 14, a ring-like base portion 196A is fixed to the bottom portion 192A and the front end thereof extends in the direction crossing the extending direction of the cylinder 190.

The piston 34 includes in the front end portion (the end portion in the direction of arrow FR in FIG. 13) a recess portion 198B formed so as to engage with the rear end portion 190A and the peripheral groove 194 thereof and includes a curved surface portion 198A in the rear end portion (the opposite end portion in the FR direction in FIG. 13). Further, the strap 14 is connected to the piston 34 through the wire 38 in a manner similar to other embodiments.

In the above air bag apparatus 180, when the piston 34 is moved in the direction of the drawing operation by receiving gas pressure injected from the inflator 16 and the piston 34 reaches the rear end portion 190A of the cylinder 190, the curved surface portion 198A of the piston 34 is brought into contact with the front end of the spring 196 and moves while elastically deforming the front end portion 196B. Further, when the piston 34 is moved in the direction of the drawing operation so as to project outwardly from the rear end portion 190A, the spring 196 presses the piston 34 downward (the direction opposite that of arrow UP in FIG. 13 by the elastic force so as to engage therewith. Accordingly, the piston 34 is forcibly removed from the extending line of the cylinder 190 and the recess portion 198B of the piston 34 is latched to the end edge of the rear end portion 190A (a state shown by the thick solid line in FIG. 13). Even when the piston 34 is drawn to the front direction (that is, the direction of arrow FR in FIG. 13) by the strap 14 from this state, the piston 34 cannot return to the inside of the cylinder 190. Therefore, even after gas injection by the inflator 16 ceases, the piston 34 cannot be returned, and the strap 14 is maintained in the extended state.

In the above-described embodiment, the structure using the stopper ring 120 or the stopper 170 and the structure using the spring 196 have been explained separately. However, the spring 196 may be applied to the structure using the stopper ring 120 or the stopper 170.

Next, a sixth embodiment in accordance with the present invention will be explained below.

Figure 15:
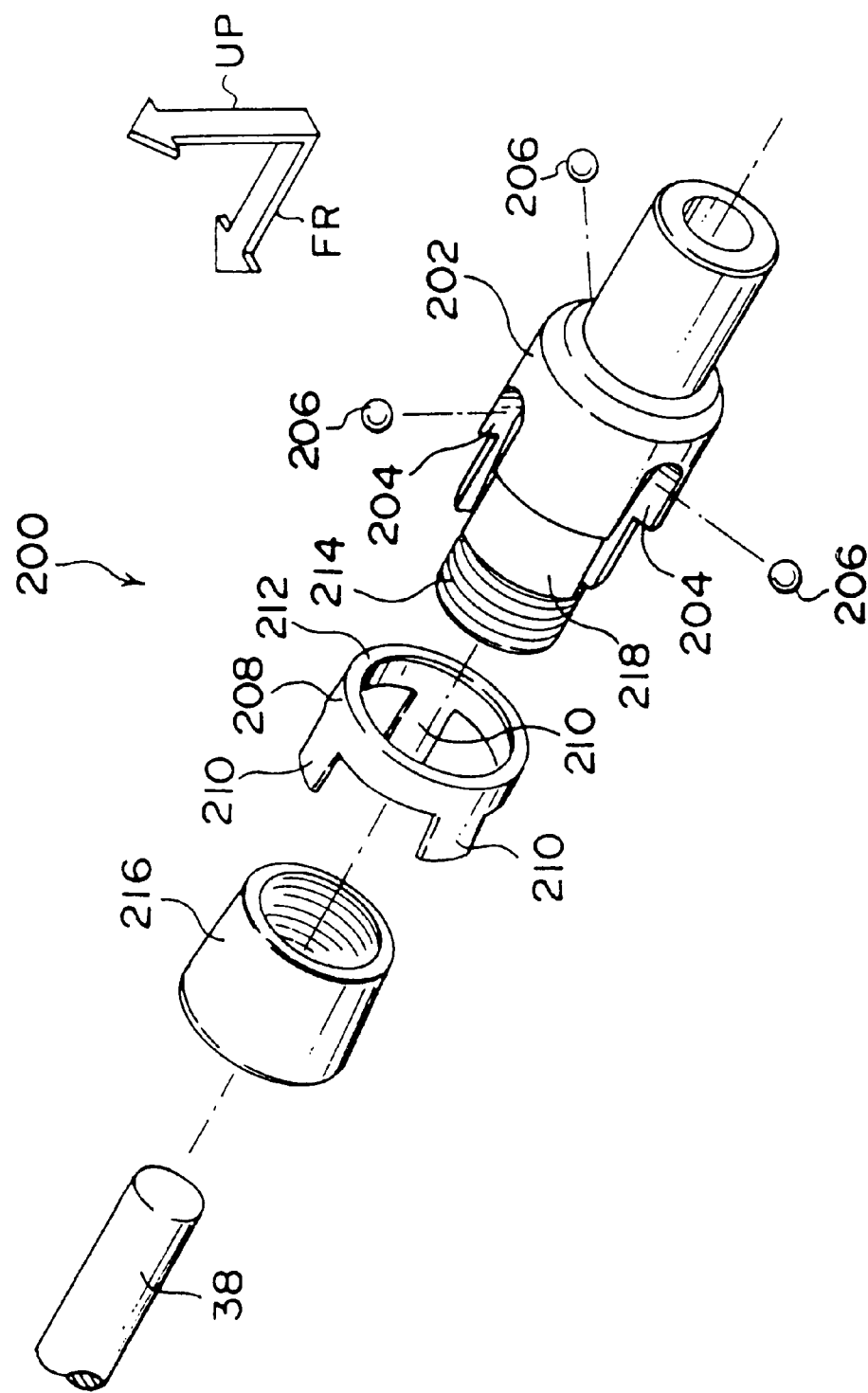
FIG. 15 is an inflated perspective view which shows a structure of a piston of an air bag apparatus in accordance with a sixth embodiment of the present invention.
Figure 16:
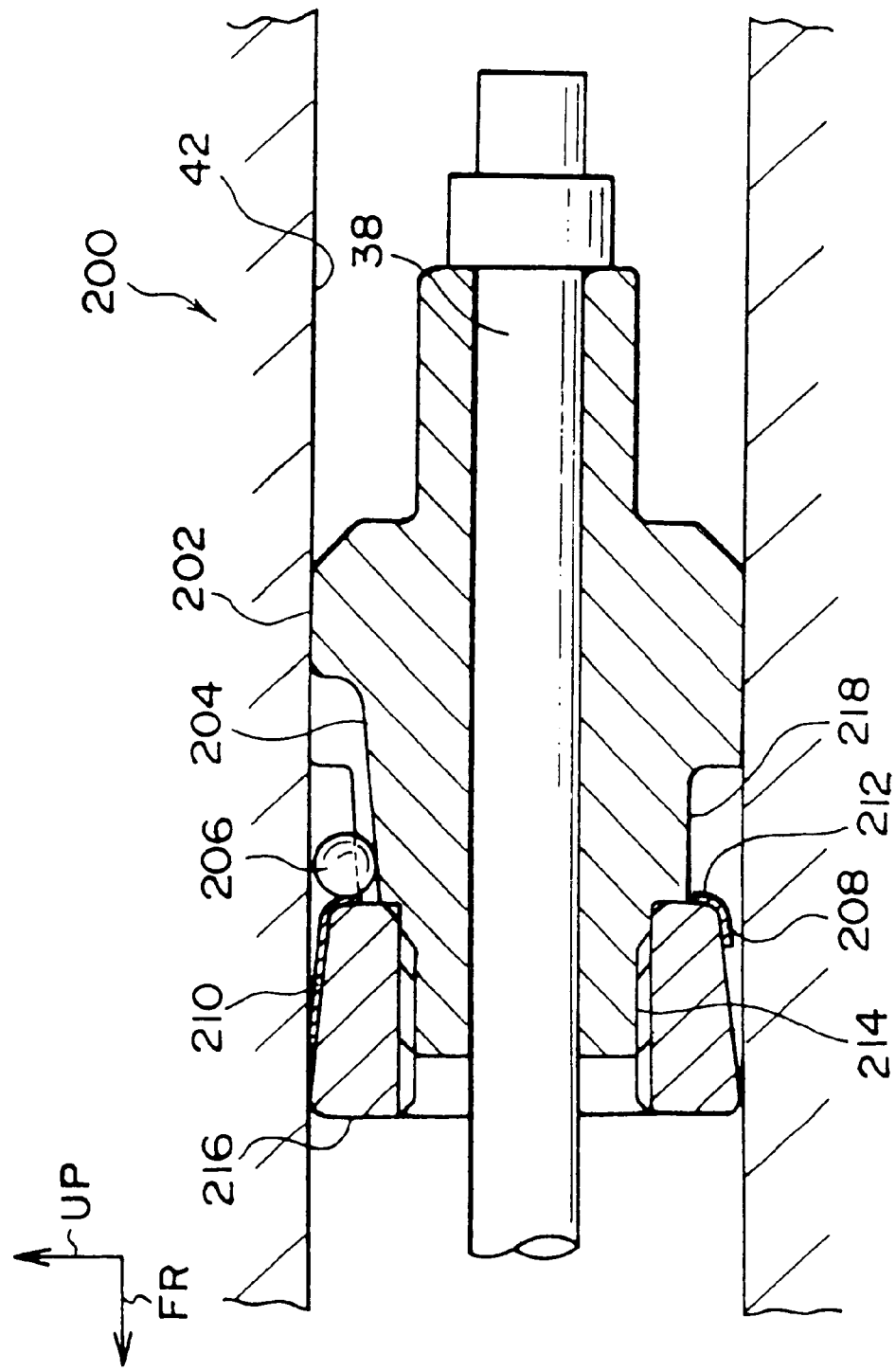
FIG. 16 is an enlarged cross-sectional view which shows a structure of the piston of the air bag apparatus in accordance with the sixth embodiment of the present invention.

FIG. 15 is a inflated perspective view which shows a piston 202 serving as drawing operation means of an air bag apparatus 200 in accordance with the sixth embodiment of the present invention. FIG. 16 shows an enlarged cross section of the piston 202. Further, FIG. 17 shows a side elevation view of the piston 202. As shown in these drawings, the piston 202 of the air bag apparatus in accordance with the present embodiment is provided with three groove portions 204 in a peripheral surface thereof. Each of these groove portions 204 is formed so that the bottom portion thereof is inclined and the depth thereof is gradually increased toward the front portion of the vehicle (in the direction of arrow FR in FIG. 16). A stopper ball 206 serving as a return-prevention member is disposed within each of the groove portions 204. The stopper ball 206 is a rigid ball made of a metal material such as stainless steel and the like and is formed so as to have a diameter slightly smaller than the width of the groove portion 204. Accordingly, the rigid ball can freely rotate along the groove 204. As long as the stopper ball 206 is not pressed by external force which can raise the stopper ball 206, the stopper ball 206 is positioned in the deepest portion of the groove portion 204, that is, in the front end portion.

In this structure, the distance between the bottom portion of each of the groove portions 204 and the inner peripheral portion of the cylinder 42 is formed so as to be longer than the diameter of the stopper ball 206 in the front end (the deepest portion) of the groove portion 204 and is formed so as to be slightly smaller than the diameter of the stopper ball 206 in the rear end (the shallowest portion) thereof. Accordingly, if the stopper ball 206 is positioned in the front end (the deepest portion) of the groove 204 (refer to FIG. 16), the stopper ball 206 is completely received within the groove 204 and if the stopper ball 206 is positioned in the rear end (the shallowest portion) of the groove 204 (refer to FIG. 18), the stopper ball 206 is brought into contact with the inner peripheral portion of the cylinder 42.

Further, the front end portion of the piston 202 is formed as a small diameter portion 218 having an outer diameter smaller than the inner diameter of the cylinder 42. The small diameter portion 218 has a radius larger than the distance between the bottom portion of the groove 204 and the center axis of the piston 202 and is formed as a taper shape having an outer diameter gradually decreasing toward the front of the vehicle (the direction of arrow FR in FIG. 16). Further, the stopper ring 208 is disposed in the small diameter portion 218. The stopper ring 208 is formed as a ring shape having an inner diameter larger than the outer diameter of the small diameter portion 218 and a plurality of contact members 210 extends from the front end portion of the vehicle in correspondence to each of the grooves 204. These contact members 210 are formed so that the front end thereof gradually approaches the inner peripheral portion of the cylinder 42 and is always in contact with the inner peripheral portion of the cylinder 42 in the front end. The rear end portion of the stopper ring 208 is formed as a flange portion 212 which is curved toward the inside direction of the radius.

A male screw portion 214 is formed in the front end portion of the piston 202 and a nut 216 is threaded thereto. The nut 216 is formed as a taper shape having an outer diameter gradually reduced toward the rear of the vehicle and in the ordinary state, the inner peripheral portion of the stopper ring 208 and the flange portion 212 are in contact with the outer peripheral portion of the nut 216 so as to prevent the stopper ring 208 from moving in the direction of the front of the vehicle.

When using a piston 202 having the above-described structure, when gas pressure injected from the inflator 16 is applied, the piston 202 is moved to the rear end side of the cylinder 42 (that is, direction opposite that of arrow FR in FIG. 16) together with the stopper ring 208 and the stopper ball 206. Accordingly, the strap 14 is drawn and the bag body 12 is made to assume an extended state (refer to FIGS. 1 and 2)

In this state, if gas pressure acting on the piston 202 is reduced, the supply of gas to the piston 202 ceases, or the head portion or the like of the vehicle occupant presses the bag body 12 in the expanded state, the piston 202 is drawn and moved to the front direction (that is, the direction of arrow FR in FIG. 16) through the strap 14.

Figure 18:
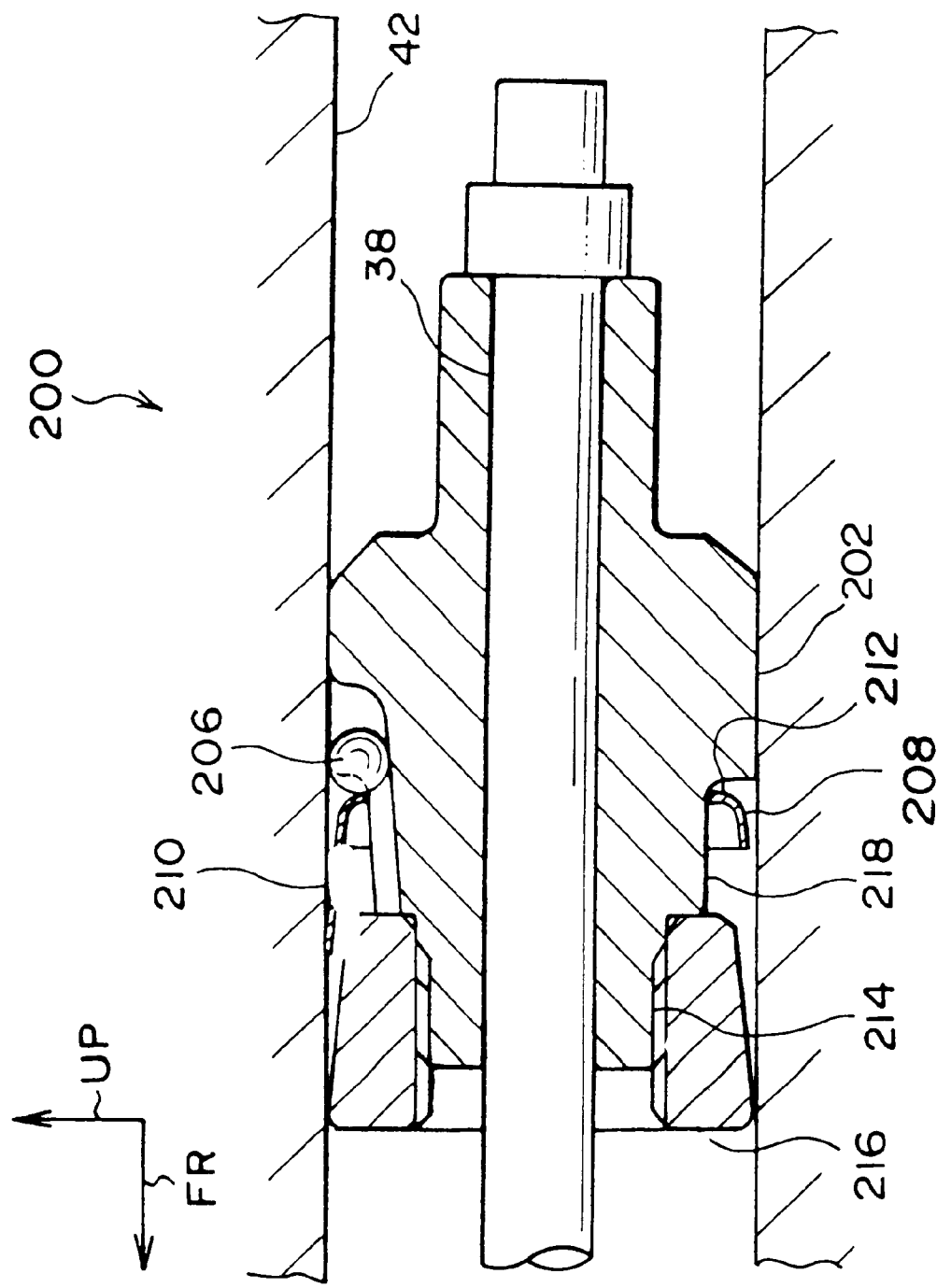
FIG. 18 is a cross-sectional view corresponding to FIG. 16 which shows a state where a piston is stopped by a performance of the return-prevention member.

In this case, although the piston 202 is supposed to be moved by the strap 14, the stopper ring 208 is supposed to keep the position by slight friction against the inner peripheral portion of the cylinder 42. Accordingly, the stopper ring 208 is moved relatively toward the rear direction of the vehicle with respect to the piston 202. The flange portion 212 of the stopper ring 208 presses the stopper ball 206 and the stopper ball 206 is moved to the rear direction of the vehicle along the inner portion of the groove portion 204. In this structure, the bottom portion of the groove portion 204 is formed as an inclined surface and has a depth in the rear end of the groove portion 204 shallower than the diameter of the stopper ball 206. Therefore, the stopper ball 206 which is moved to the rear end portion of the groove 204 by being pressed by the flange portion 212 of the stopper ring 208 is partially projected to the outside in the radial direction from the outer periphery portion of the piston 202 so as to be brought into contact with the inner peripheral portion of the cylinder 42, as shown in FIG. 18. When the stopper ball 206 is stopped by the friction force generated between the stopper ball 206 and the inner peripheral portion of the cylinder 42, the stopper ball 206 presses the bottom portion of the groove 204 so that the piston 202 is stopped. Accordingly, the strap 14 is kept in the extended state (refer to FIGS. 1 and 2).

Accordingly, in the present air bag apparatus 200, wherever the piston 202 is positioned within the cylinder 42, the piston 202 can be immediately stopped after the piston 202 is moved to the front direction (that is, the direction indicated by arrow FR in FIG. 16) so that the strap 14 is kept in the extended state.

In the second to sixth embodiments, although an explanation is given of a structure in which the return-prevention means is applied to the air bag apparatus 10 commonly using gas from the inflator 16 for inflating and expanding the bag body 12 in the drawing operation, an inflator module for performing the drawing operation of the strap 14 can be applied in a manner separate from the inflator 16 for inflating and expanding the bag body 12. In this case, the above-described structure of the second to sixth embodiments can be applied to the inflator module as is for performing the drawing operation of the strap 14.

What is claimed is:

1. An air bag apparatus comprising a bag body in a retracted condition disposed along a curved portion of a vehicle with both ends supported and inflated and expanded by gas injected from an inflator to an internal portion thereof, wherein said air bag apparatus comprises:

a strap disposed in the internal portion of said bag body and having one end supported at a vehicle body; and drawing operation means for drawing the other end of said strap so as to extend said strap along said curved portion of the vehicle.

2. An air bag apparatus according to claim 1, wherein said drawing operation means draws said strap by gas pressure generated in said inflator.

3. An air bag apparatus according to claim 1, wherein at least a portion of the intermediate portion in a longitudinal direction in said air bag body is supported by said curved portion of the vehicle.

4. An air bag apparatus according to claim 1, wherein said strap is made of a member which absorbs energy by plastic or elastic deformation.

5. An air bag apparatus according to claim 1, wherein a return-prevention member for preventing returning of the strap drawn by said drawing operation means in a reverse direction is provided.

6. An air bag apparatus according to claim 1, wherein said drawing operation means is provided with a piston connected to the other end of said strap and a cylinder receiving said piston so as to move in the direction of said drawing operation.

7. An air bag apparatus according to claim 5, wherein said drawing operation means is provided with a piston connected to the other end of said strap and a cylinder receiving said piston so as to move in the direction of said drawing operation.

8. An air bag apparatus according to claim 6, wherein said drawing operation means is provided with a vent passage introducing gas generated in said inflator to the inside of said cylinder close to said strap side and an opening portion connecting the vent passage to the inside of said bag body.

9. An air bag apparatus according to claim 1, wherein said drawing operation means extends said strap from the curved portion of the vehicle before said bag body is inflated and expanded.

10. An air bag apparatus according to claim 8, wherein said drawing operation means is provided with a valve opening at a predetermined pressure in said opening.

11. An air bag apparatus according to claim 7, wherein said piston has a taper portion in which a diameter thereof is gradually reduced in a direction opposite that of said drawing operation and wherein said return-prevention member is a stopper formed substantially as a ring shape, is fitted to said taper portion at the smaller diameter side, moves relatively in said drawing operation direction with respect to said piston if said piston is moved in the direction opposite that of said drawing operation, and has the diameter thereof enlarged by contacting said taper portion so as to contact both an outer peripheral portion of said piston and an inner peripheral portion of said cylinder.

12. An air bag apparatus according to claim 11, wherein said piston is provided with a piston body connected to the other end portion of said strap and a cover member which has a large diameter portion disposed between said cylinder and the piston body so as to cover an outer peripheral portion of the piston body, a taper portion formed so as to have its diameter gradually reduced in the direction opposite that of said drawing operation and having said stopper fitted in a side having a smaller diameter, and a flange portion disposed in an end portion in the direction of said drawing operation and being in contact with the inner peripheral portion of the cylinder so as to slide.

13. An air bag apparatus according to claim 11, wherein said stopper formed substantially as a ring shape has a notch in a part thereof.

14. An air bag apparatus according to claim 11, wherein said stopper formed substantially as a ring shape has an outer peripheral surface which can provide surface contact with the inner peripheral surface of said cylinder.

15. An air bag apparatus according to claim 7, wherein said piston is provided with a groove portion formed so as to gradually increase the depth from the inner peripheral portion of said cylinder in the direction opposite that of said drawing operation and wherein said return-prevention member is a stopper ball which is formed as a spherical shape having a diameter smaller than the distance between the inner peripheral portion of said cylinder in the deepest portion of said groove portion and the bottom portion of said groove and larger than the distance between the inner peripheral portion of said cylinder in the shallowest portion of said groove, is disposed in an inside portion of said groove so as to freely rotate and if said piston is moved in the direction opposite that of said drawing operation, is moved relatively in the direction of said drawing operation with respect to said piston so as to be in contact with the inner peripheral portion of the cylinder.

16. An air bag apparatus according to claim 15, wherein said piston is provided with a small diameter portion formed so that a portion of said stopper ball projects to the outer peripheral portion having said groove portion, and wherein a stopper ring is fitted to the small diameter portion, said stopper ring being moved relatively in the direction of said drawing operation with respect to said piston if said piston is moved in the direction opposite that of said drawing operation so as to press the projecting portion of said stopper ball to the shallowest portion of said groove.

17. An air bag apparatus according to claim 7, wherein the end of said cylinder disposed in the side of the direction of said drawing operation is formed as an opening end and wherein said return-prevention member is provided with an elastic member which is formed in the opening end of said cylinder so as to project in a direction crossing the direction of said drawing operation and is engaged with the piston reaching said opening end so as to remove said piston from the extending line of said cylinder, thereby preventing said piston from returning to the cylinder.

* * * * *